United States Patent [19]

Taylor

[11] Patent Number: 5,091,646
[45] Date of Patent: Feb. 25, 1992

[54] INTEGRATED THERMAL IMAGING SYSTEM

[75] Inventor: William H. Taylor, South Deerfield, Mass.

[73] Assignee: Kollmorgen Corporation, Simsbury, Conn.

[21] Appl. No.: 529,933

[22] Filed: May 29, 1990

[51] Int. Cl.$^5$ .......................................... H01L 31/052
[52] U.S. Cl. .................................. 250/332; 250/334; 250/352
[58] Field of Search ........... 250/352, 332, 334, 370.08, 250/330, 333; 358/113

[56] References Cited

U.S. PATENT DOCUMENTS

| | | | |
|---|---|---|---|
| 2,895,049 | 7/1959 | Astheimer et al. | 250/334 |
| 3,963,926 | 6/1976 | Borrello | 250/334 |
| 4,349,843 | 9/1982 | Laakmann et al. | 250/334 |
| 4,421,985 | 12/1983 | Billingsley et al. | 250/338.1 |
| 4,507,551 | 3/1985 | Howard et al. | 250/216 |
| 4,538,181 | 9/1985 | Taylor | 358/208 |
| 4,783,593 | 11/1988 | Noble | 250/352 |
| 4,806,761 | 2/1989 | Carson et al. | 250/334 |

OTHER PUBLICATIONS

"TV Compatible Forward Looking Infrared", R. F. Anderson, Optical Engineering, vol. 13, No. 4, Jul.-/Aug. 1974, pp. 335-338.
Preliminary Common Module Designer Handbook, U.S. Night Vision Laboratory, Ft. Belvoir, Va. (unclassified).
Modern Optical Engineering, "Reflecting Systems", Warren J. Smith, McGraw Hill, N.Y.C., pp. 385-398.
Glass Engineering Handbook, E. B. Shand, McGraw Hill, NYC (1958), pp. ix-x, 119-131.
Infrared System Engineering, Hudson, John Wiley, New York (1969), Chapter 11.
CTI-Cryogenics Application Engineering Note, "Split Sterling Cycle Cryocooler-How It Works", (undated).
Berry, "Progress on Miniature Cryocoolers at Hughes Aircraft Company", Meeting of the IRIS Specialty Group on Infrared Imaging, Naval Training Center, Orlando, Fla., Mar. 10-12, 1987.
"Trends in Focal Plane Technology", Chan., SPIE, vol. 217, Advances in Focal Plane Technology (1980), pp. 6-8.
Night Vision Laboratory Static Performance Model for Thermal Viewing Systems, Research and Development Technical Report, ECOM-7043 (Apr. 1975), pp. 1-34.
The Infrared handbook, Wolfe (editor), The Infrared Information & Analysis Center, Environmental Research Inst. of Michigan, 1985, pp. 12-22 to 12-27.

Primary Examiner—Carolyn E. Fields
Attorney, Agent, or Firm—Morgan & Finnegan

[57] ABSTRACT

A totally integrated thermal imaging system has a dewar housing including imaging optics, a scanning mirror and a curved detector array. The imaging optics constitute a meniscus lens and a spherical focusing mirror. The scanning mirror scans the image, and the spherical mirror focuses the scanned image onto the detector array. The meniscus lens advantageously corrects aberrations. A detector support provides access for cryogenic cooling of the detector, and individual cold shielding of the detector elements is made possible by the telecentricity of the optics. Processing electronics, at least a portion of which may also be disposed on the detector support, process the detector signals to display an image. The integrated structure advantageously eliminates any need for separate scanner, imager, detector dewar and electronics modules.

99 Claims, 22 Drawing Sheets

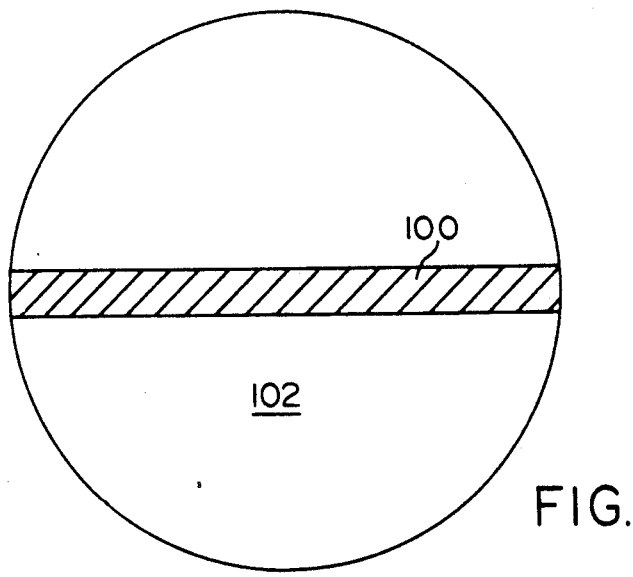
FIG. 18
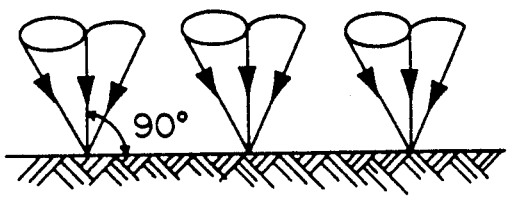
FIG. 22
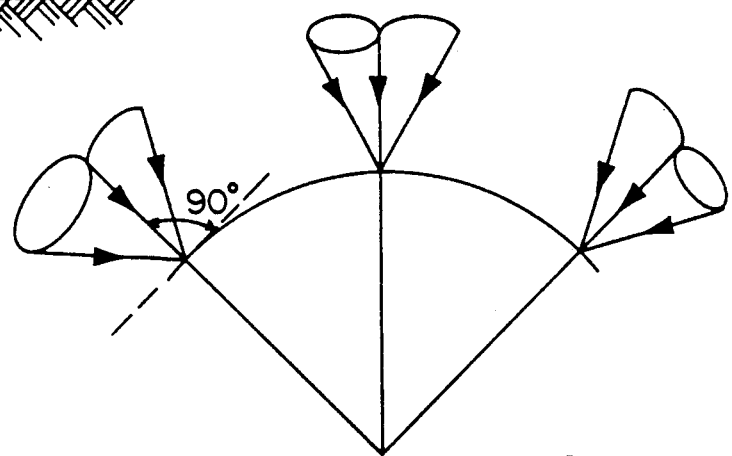
FIG. 23
FIG. 24
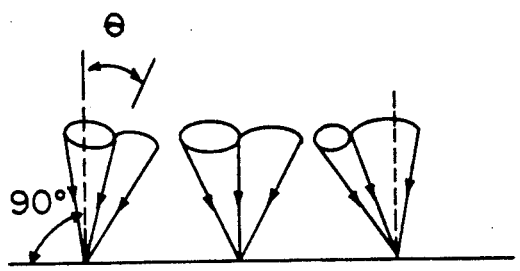

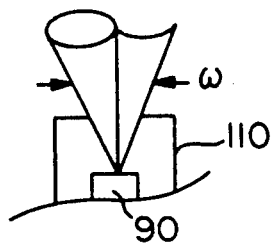
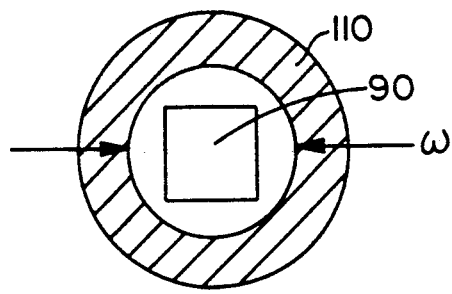
FIG. 25  FIG. 26
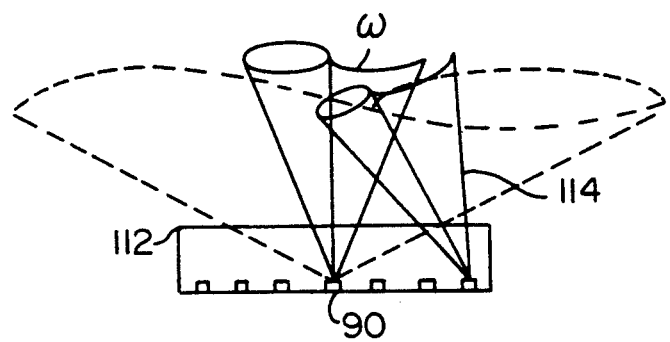
FIG. 27
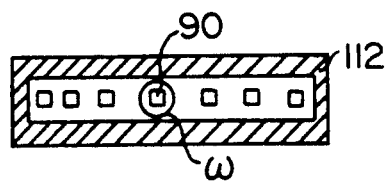
FIG. 28

1

INTEGRATED THERMAL IMAGING SYSTEM

BACKGROUND AND OBJECTS OF THE INVENTION

1. Field of the Invention

This invention relates to thermal imaging, and to a system for producing a displayable image based upon the radiation emitted from objects due to their temperature and emmissivity. More particularly, this invention relates to an integrated thermal imaging system wherein several modules are integrated into a single compact unit:

2. Background Art

Early thermal imagers were serial scan devices. In serial scan devices, a single detector element is scanned optically such that it sequentially receives radiation from each picture element or "pixel" in the scene. This type of serial scan device is described in Anderson, R. F., "TV Compatible Forward Looking Infrared", *Optical Engineering*, Vol. 13, Issue 4, July/August, 1974. In this type of system, once the detector is irradiated, the detector output signal is amplified and processed to form a TV image of the scene or object. The principal shortcoming of the serial scan thermal imager, which has been referred to in the art as a "FLIR" (forward-looking-infrared), is the limited sensitivity afforded by a single detector element. Enhanced sensitivity in serial scanning is acheived by adding elements in a row, then time delaying and integrating the outputs of the elements to acheive higher signal-to-noise ratio at the detector output. Even further enhancement is acheived by adding rows of detectors. The detectors are then scanned in parallel, and the output signal is converted to a serial format for display through processing electronics. The total number of elements in systems of this type range from about 20 to 50.

Another approach to thermal imaging design employs parallel scanning. This type of device has been referred to in the art as a parallel scan FLIR. In this device a linear array of detector elements is scanned over an image such that the vertical dimension of the image spans the length of the array. A "framing" or "scanning" mirror, usually oscillating at about 60 Hz, and an imaging lens direct light rays from the scene onto the linear detector array. The detector array is fixed while the image moves horizontally across the array. At the completion of the scan, the mirror is driven back rapidly to its original position, and the scan cycle is repeated. This process provides a highly efficient unidirectional linear scan which results in two interlaced "fields". A scan converter is used to convert the data into a serial format suitable for television display. Typically, 120 detector elements are used in the linear array, thereby offerring enhanced sensitivity as compared to the serial scan type of device. A typical parallel scan system is also described by Anderson.

In heretofore known thermal imaging systems of the serial and parallel scanning types a "common module" approach has been adopted. In a common module system each of the various elements of the imaging system are constructed as independent, modular components which are assembled and must operate together in order to provide a complete system. The modules typically comprise separate telescope, scanner, imager, detector/dewar, cooling engine, and electronics modules. This approach to thermal imager design is generally described in *Preliminary Common Module Designers Handbook*, U.S. Night Vision Laboratory, Ft. Belvoir, Va. (Contract: DAAG53-75-C-0718.—Approved for Public Release).

By way of example only, FIG. 1 illustrates the various modular components of a thermal imager constructed in accordance with the common module approach. As there shown, the modular components consist of a telescope, a scanner, an imager, a detector/dewar with an associated cooling source, and electronics modules for amplifying and processing the detector signals. The telescope is of afocal design, and generally consists of a Galilean telescope to provide magnification of the image. In the case of the serial scan FLIR, the scanner unit performs a vertical and horizontal scan in order to create a pixel scan of the image. In the case of a parallel scan FLIR, the scanner is an oscillating flat mirror which performs a horizontal scan of the image. In either case, the imager consists of three or more lens elements and a folding mirror. The imager receives the output of the scanner and forms an image of the scanned scene on the detector. The detector/dewar consists of a dewar, a sealed flask with its contents under vacuum, and a detector disposed within the dewar. The detector has a flat dewar window, and the imager focuses the image onto the detector through the dewar window. The detector/dewar is coupled to the cryogenic cooling system and receives cold source input so as to cool the detector to cryogenic temperature for optimum performance. In a parallel scan FLIR the detector typically consists of a linear array of about 120 detector elements with output pins for each detector element. The detector converts the image to electrical signals, and preamplifier electronics, typically six circuit boards for a 120 detector array, amplify the electrical outputs of the various elements of the detector array. Signal processing from this point forward in the system depends upon the particular system configuration. A visual display of the infrared scene can be effected via a rather complex arrangement of lenses, light-emitting diodes and timing circuitry. A television display requires scan converter electronics to convert parallel channel outputs into a serial format for presentation in a standard television format.

As the art is developing, great emphasis is being placed on sensitivity enhancement. One way to enhance sensitivity still further is to use a full frame two dimensional array, known as a "staring array". In this type of array no scanning is employed, and each detector element of the array corresponds to a picture element in the scene. In such a system, a lens is used to form the image on the array in a manner similar to an ordinary photographic camera with the array replacing the film at the focal plane. However, manufacturing technology limitations have thus far prevented the fabrication of sufficiently large arrays which can attain adequate performance at acceptable costs.

The demand for still further sensitivity and the limitations of existing manufacturing technology relative to two dimensional arrays have led to the development of newer parallel scan systems employing several times more detector elements. Newer arrays may consist of as many as 1000 detector elements per column, with 1 to 16 columns per array. For such multi-column arrays a time delay and integration operation is performed across the various columns for corresponding detector elements in the columns. Such arrays require detector signal preamplification, multiplexing, and processing directly on the focal plane in order to avoid the need to rout a prohibitively large number of electrical leads out of the detector/dewar. Of course, the detector elements still must be cooled, typically to 77° Kelvin. The basic common module approach is to be retained, to the extent possible, in these more sensitive next generation systems. More particularly, separate scanner, imager, and detector/dewar modules are required. All of these components add to the overall size, weight and complexity of the system.

Thus, there exists a need for an improved thermal imaging system having enhanced system sensitivity while also reducing the bulk, weight and cost of the system.

OBJECTS OF THE INVENTION

It is therefore one object of the present invention to provide a smaller, more compact, and lighter weight thermal imaging system.

Another object of the invention is to provide a thermal imaging system having improved system sensitivity.

It is a further object of the present invention to provide a simplified thermal imaging system that can presently be attained following the common module approach.

Another object of the invention is to provide a thermal imaging system having improved imaging optics.

Another object of the invention is to provide a thermal imaging system having fewer components, thereby reducing the complexity of the system.

These and other objects and advantages are accomplished in a highly compact and light weight integrated thermal imaging system having greatly improved radiation transmission and, hence, system sensitivity. The highly compact thermal imaging system of the present invention provides excellent imaging while also presenting a potential opportunity to reduce thermal imaging system cost.

SUMMARY OF THE INVENTION

The thermal imaging system constructed in accordance with the present invention represents a radical departure from, and, indeed, a complete rejection of, conventional thermal imaging system design, namely, the common module approach. Unlike prior systems wherein the dewar housing merely houses the detector for cooling, the thermal imaging system in accordance with the present invention provides a highly compact integrated thermal imaging system wherein the principle components of the system, namely, the scanner, the imager, and the detector are all either housed within or constitute a part of the dewar, and operate entirely within the vacuum environment of the dewar. In addition, at least some of the electronic components may also be incorporated into the dewar and may be mounted on the detector support, a microminiature box beam or other type structural member within the dewar housing. The beam matches the image surface so that the detector array is disposed at the focus of the image. As will readily be appreciated, it is indeed remarkable that a single, compact and lightweight unit can be provided which effectively replaces all of the scanner, imager, detector/dewar and some electronics modules of prior thermal imaging systems.

In the preferred thermal imaging system of the present invention a dewar is provided having a meniscus lens of concentric construction instead of a conventional flat surfaced dewar window. Since any thermal imaging system requires a dewar window, the transformation of the flat window to a lens is, in effect, a means of acheiving imaging optics without incorporating separately dedicated lenses. A spherical primary imaging mirror is mounted within the dewar housing, and a scanning mirror is disposed within the dewar with the meniscus window lens and spherical mirror centered on the scanning mirror vertex. The optical design, a Bouwers-Maksutov configuration, represents the ultimate in optical simplicity, and is adopted without any compromise in the size of the field of view, and aperture size or image quality. The optical system consists basically only of two components, a meniscus lens and a primary imaging mirror. Remarkably, the meniscus lens and the spherical mirror constitute the entire set of imaging optics, and eliminate any need for a separate imager module and the corresponding multiplicity of lens elements, spacers, and retaining rings all disposed in a separate lens housing. The elimination of separate dedicated lenses and/or mirrors reduces the number of optical surfaces in the system, thereby improving thermal radiation transmission and system sensitivity. The optical design also permits a very large relative aperture and field of view. Remarkably, such aperture and field of view are accomplished while maintaining uniform, high quality imaging across the field of view.

The scanning mirror is smaller in size and design to the U.S. Government Module scanning mirror, and is a flat mirror disposed within the dewar in the optical path between the meniscus window and the spherical primary mirror. The scanning mirror represents the aperture stop of the optical system, and is oriented to fold the line of sight approximately ninety degrees to the incoming radiation entering through the meniscus lens to direct the radiation toward the spherical mirror. The scanning mirror can be driven with an external motor via a torsion tube design which allows the mirror to be driven in an oscillatory manner without seals of any kind. Alternatively, a rotary seal of the vacuum qualified ferro-fluidic type can be employed in conjunction with conventional bearings. As yet a further alternative, a drive system could be employed which uses a magnetic coupling through the housing wall between the external drive motor and the internal mirror shaft.

The spherical mirror receives radiation from the scanning mirror and forms a spherical image at large relative aperture and wide field of view. The spherical image is located approximately midway between the vertex of the scanning mirror and the spherical mirror, and is well corrected for aberrations due to the Bouwers-Maksutov optical design employed in the integrated imaging system of the invention. Advantageously, the optical design provides telecentric imaging across the field of view. Telecentric imaging is conductive to individual cold shielding of the detector elements, further enhancing system sensitivity. System sensitivity is improved still further by using detector arrays having several thousand detector elements rather than about one hundred.

As a further advantage of the invention, the optical system is used with an inverting telescope, that is, a telescope having an exit pupil external to the telescope. The exit pupil, the point at which the optical ray bundle envelope is smallest, is caused to fall on the scanning mirror, thereby permitting use of a very small scanning mirror, further reducing the size, weight and complexity of the system.

An equatorial sliver of the spherical image is intercepted by an essentially linear detector array mounted on a thin curved support structure which matches the curvature of the image. The support structure serves not only as the detector array substrate but also as the substrate for on-focal-plane processing electronics, such as preamplifiers and circuitry for multiplexing and time delay and integration functions. The support structure additionally provides a cryogenic cooling interface to the detector and, in the preferred hollow box beam detector support, embodies a cryostat for Joule Thomson type cooling wherein gas under high pressure comes in contact with the back of the detector support to cool the support, detector substrate, detectors and associated cold shielding. The inner and outer surfaces of the preferred box beam detector support provide potential mounting sites for on-focal-plane processing circuitry, and is well suited to accommodate the preamplification, integration and time delay circuitry necessary to process detector signals from the preferred arrays having thousands of detector elements. The beam interface to the dewar is also well suited to accommodate the required electrical leads. The detector support may also be configured to accept a cold finger from a closed cycle refrigerator or thermo-electric cooler placed in contact with one or both ends of the detector support, thereby being placed in thermal contact with the detector array. A pedestal cold finger could also be used. The detector support also provides the electrical and cooling connections between the dewar housing and external electrical processing equipment.

In operation, infrared radiation from the scene is admitted to the system through the meniscus window, is reflected from the scanning mirror and is collected and focused by the spherical mirror onto the curved detector array. At any instant in time the detector is receiving radiation which corresponds to a thin vertical strip in the scene. At the next instant in time the scanning mirror has advanced slightly such that an adjoining vertical strip of the scene is imaged onto the detector. The scanning mirror rotates until the entire scene is scanned, and at the end of the scan is driven in a rapid fly back to its original position ready to commence scanning of the next frame of the image. The electrical signals of the detectors are processed in the focal plane circuitry, such as by being amplified, multiplexed and time delayed and integrated, and are outputted for further processing and display on a television monitor. The unique optical design of the system having few optical surfaces, a wide field of view and little if any aberration across the field of view obtain an excellent displayed image.

As will be appreciated, the objects of the present invention are accomplished by providing a totally integrated thermal imaging system in which the dewar housing either incorporates or houses all optical elements other than a telescope. The dewar housing receives, scans and images the scene onto a cooled linear detector array mounted so as to intercept a sliver of a curved image. The improved optical design of the present invention has few optical elements and surfaces, thereby enhancing transmission and, hence, sensitivity. The thermal imaging system is highly compact and, due to the unique optical design, completely eliminates any need for separate scanner, imager, and detector/dewar components, thereby reducing the bulk, weight, number of piece parts and complexity of the thermal imaging system as a whole. Fewer and simpler parts also reduces costs, an important consideration which has heretofore limited adoption of thermal imaging on a broader scale for a variety of applications. Moreover, the thermal imaging system is well suited for onfocal-plane processing, further eliminating at least some previously separate electronic modules. It is surprising and wholly unexpected to find that these highly desirable results can be accomplished by including all of the principle optical elements within or as part of the dewar in direct violation of the known and accepted common module approach.

These and other advantages will be realized by those of ordinary skill in the art, or will be learned by practice with the invention. The foregoing general description and the following detailed description as well are exemplary and explanatory of the invention, and are not restrictive thereof.

BRIEF DESCRIPTION OF THE DRAWINGS

The manner in which the invention is achieved and its mode of operation can be better understood with reference to the accompanying drawings, which form a part of this specification, in which:

FIG. 18 is an illustration of the image obscuration created by the detector support;

FIG. 22 is an illustration of telecentric ray cones relative to a plane surface;

FIG. 23 is an illustration of telecentric ray cones relative to a curved surface;

FIG. 24 is an illustration of non-telecentric ray cones relative to a plane surface;

FIGS. 25 and 26 are enlarged cross-section and plan views, respectively, illustrating cold shielding of a single detector element;

FIGS. 27 and 28 are enlarged cross-section and plan views, respectively, illustrating cold shielding of a linear array;

DETAILED DESCRIPTION OF THE PREFERRED EMBODIMENTS

Figure 1:
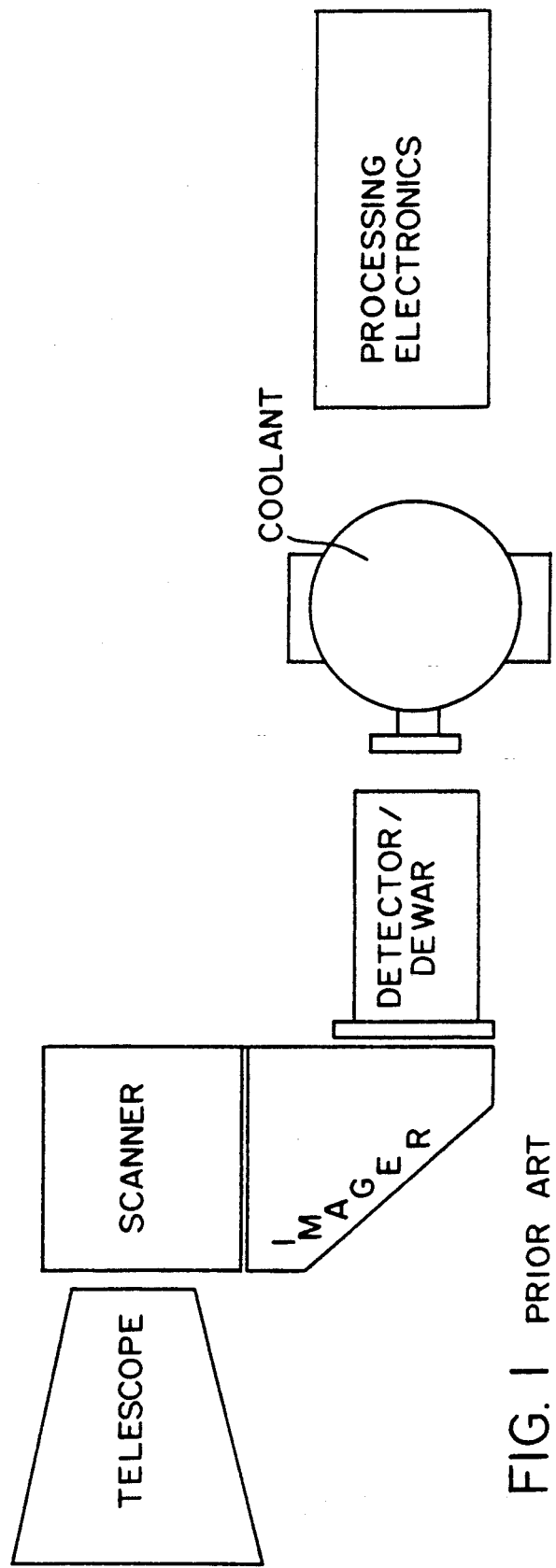
FIG. 1 is a block diagram illustration of the prior art common module approach to thermal imaging.

Referring now to the accompanying drawings, the integrated thermal imaging system 10 of the present invention includes a dewar type flask housing 12 encapsulating a vacuum environment, and having a meniscus lens 14, a rotatable scanning mirror 16, a focusing mirror 18, and a detector array 20. The meniscus lens acts as the system window, allowing infrared radiation to impinge on the scanning mirror. The scanning mirror performs a linear scan of the image, and the focusing mirror focuses the radiation onto the detector array. All couplings in and out of the housing are vacuum tight, and the mechanism for driving the scanning mirror is constructed so as to maintain the vacuum within the system housing. By way of example, the scanning mirror drive motor 22 may be attached to the outside wall of the system housing 12. The drive motor rotates a drive shaft 24 mounted through a hydrodynamic vacuum bearing seal which constitutes an integral part of the scanning motor and allows rotational motion to be imparted to the drive shaft without compromising the vacuum environment within the housing. The scanning mirror is mounted to the drive shaft and rotates therewith. Alternatively, it is contemplated that the drive shaft might be sealed off from the interior of the system housing by being mounted within a torsion tube. In such a construction the drive shaft would impart rotary motion to the torsion tube without any need for the drive shaft to communicate directly with the vacuum environment of the housing. In this configuration the scanning mirror is mounted and rotates with the torsion tube. The advantage of the torsion tube design is that seal implementation is simplified.

In the preferred embodiment, the detector array is mounted on a curved detector support arch 26 disposed at the focusing mirror image so that the detectors receive a thin silver of the spherical image formed by the preferred spherical focusing mirror. Additionally, detector support arch 26 is formed as part of a hollow box beam 28 which extends into the vacuum housing. Hollow box beam 28 permits access to the detector support arch for a cryogenic coolant conduit 30 and electrical leads 32 required to cool and support the detector array. Advantageously, the detector support arrangement requires only static seals through the housing wall. Preferably, electronics for preamplification, time delay and integration, and multiplexing are incorporated into or mounted on the detector support arch.

The arrangement of meniscus lens 14 and focusing mirror 18 combine to form a Bouwers-Maksutov concentric system. In this system, the meniscus lens may be characterized as the corrector lens, and the focusing mirror as the "primary." The thermal imaging system of the invention is made very compact by incorporating the meniscus lens into the dewar housing as the dewar window and mounting the focusing mirror adjacent to the dewar housing wall. Thus, the meniscus lens and the focusing mirror perform the entire function of the imager module of prior art thermal imaging systems (see FIG. 1). The prior art scanner module is replaced by a much smaller assembly consisting of scanning mirror 16, drive motor 22, and drive shaft 24. Advantageously, a much smaller scanning mirror may be used because the present invention is designed to operate with an inverting telescope instead of the traditional Galilean type of telescope employed in the prior art. That is, in prior thermal imaging systems including a Galilean telescope the ray bundles do not form an exit pupil behind the rear surface of the telescope, so relatively large scanners and scanning mirrors must be used in order to accommodate the image. In contrast, when an inverting type of telescope is used with the present invention, the exit pupil, i.e., the location where the diameter of the optical ray bundle is the smallest, is external to the rear surface of the telescope and is caused to fall on the scanning mirror. Because the diameter of the ray bundles is smallest at the scanning mirror, a much smaller scanning mirror may be used. This not only reduces the size and weight of the mirror and the housing, but also advantageously reduces the requirements of the drive motor, drive shaft and associated bearings and seals, further reducing the size, weight and energy requirements of the system, as a whole.

In the preferred embodiment, recent advances in microcircuit technology are used to mount electronic circuits, such as preamplification, time delay and integration, non-uniform detector response correction, and multiplexing for serial output, directly on and/or in the detector support instead of on external circuit boards. This advantageously reduces the number of electrical leads which must reach the detector through the housing wall and permits a large number of detectors without requiring a greater number of electrical leads than can be accommodated.

Figure 2:
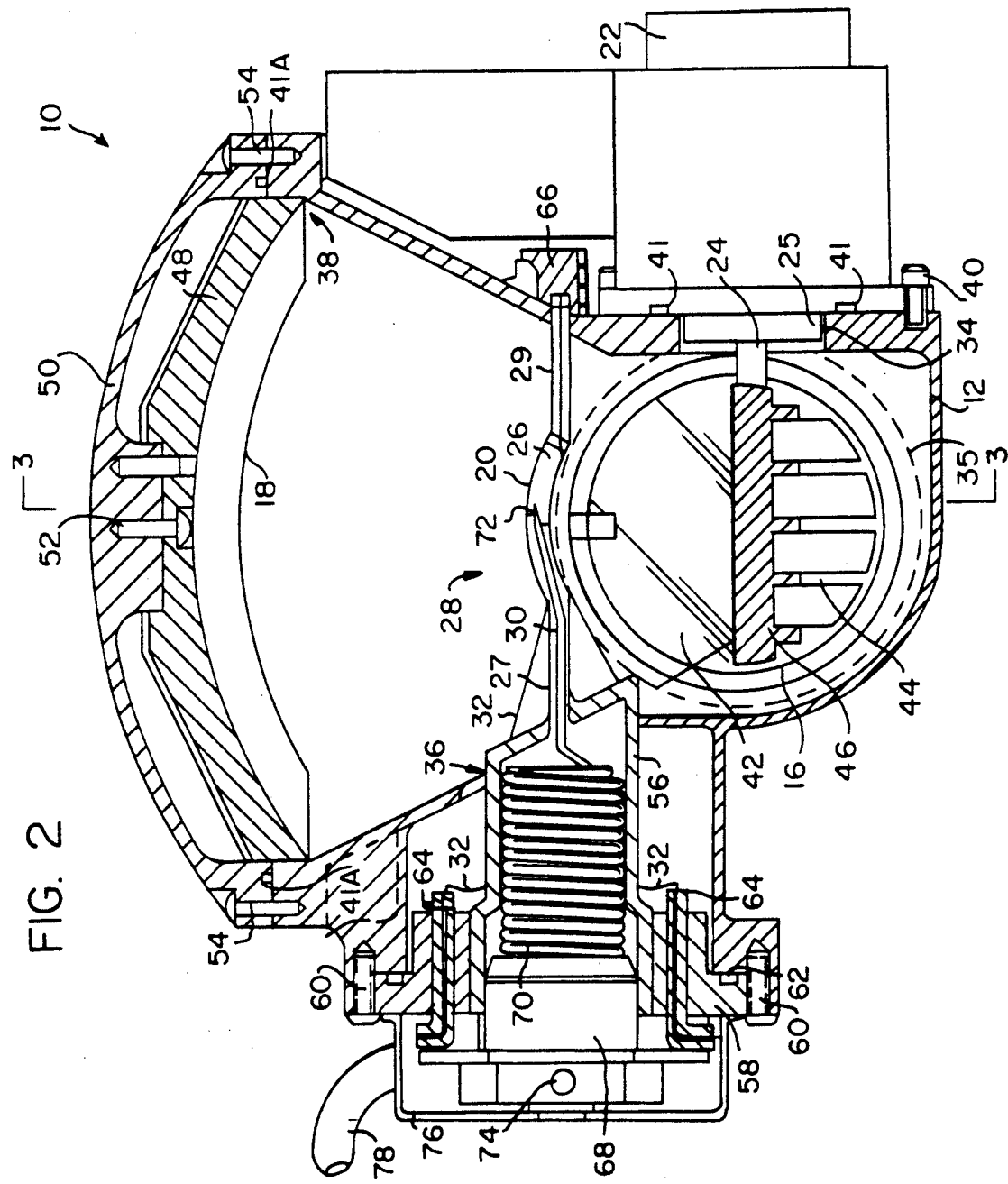
FIG. 2 is a cross-section view of an integrated thermal imager constructed in accordance with a preferred embodiment of the present invention.

Referring more specifically to FIG. 2, a cross-section view of a thermal imaging system constructed in accordance with the invention, dewar housing 12 is constructed of a corrosion resistant steel alloy and is configured and dimensioned to minimize weight and surface area. Corrosion resistant steel alloy has low permeability to provide good vacuum holding ability and low thermal conductivity between the inner housing walls and the detector array. Preferably, the inner housing walls are highly reflective to further minimize housing emissivity and radiation conductance to the detector array. Housing 12 has a scan motor port 34, a window aperture 35 (shown in phantom), a detector support port 36, and a primary mirror mounting port 38. Scan motor receiving port 34 accommodates the bearing seal 25 of scan motor 22, with scan motor 22 being sealingly mounted to the housing with motor bolts 40 and a metal vacuum seal 41. Scan motor 22 is an oscillating motor selected to minimize thermal conductivity to housing 12 and maximize thermal conductance to the ambient atmosphere. The motor should also be shielded against electromagnetic interference. Advantageously, the optical design permits use of a relatively small scanning mirror, so a scan motor of relatively low power can be used to drive the scan mirror. Drive shaft 24 extends through the drive motor bearing seal 25 into the interior of housing 12, with scan mirror 16 being mounted to the drive shaft. The scan mirror is a low inertia mirror constructed of a strong, lightweight material which is highly reflective to infrared radiation. The preferred scanning mirror material is beryllium. In FIG. 2, the scan mirror is shown in partial cross section, showing scan mirror reflective surface 42 and scan mirror support ribs 44 extending from a scan mirror mounting support 46 configured and dimensioned to permit scanning mirror 16 to be mounted onto drive shaft 24. Scanning mirror 16 is centrally disposed relative to meniscus window aperture 35, shown in phantom in FIG. 2.

Focusing mirror 18 is mounted to a focusing mirror support 48 which, in turn, is mounted to housing cover 50. The focusing mirror support may be bolted or otherwise fastened to the housing cover by one or more mirror support bolts 52, with the focusing mirror being adhesively attached to the mirror support. Housing cover 50 is securely attached to housing 12, such as by housing cover bolts 54. Preferably, housing cover 50 engages a guided support associated with housing 12, such as multiple pin in slot engagement, in order to ensure consistent placement of the cover and, hence, positioning of the focusing mirror within the housing. The configuration shown in FIG. 2 is conducive to manufacture since the mirror and mirror support can be attached to the housing cover with a high degree of positional accuracy, and the guided support engagement between the housing cover and housing ensures proper alignment of the focusing mirror with scanning mirror 16 and detector 20. It is also contemplated, however, that the focusing mirror and focusing mirror support could be mounted within the housing independently of the housing cover. While such a configuration would, no doubt, slightly increase the size of the system, such a configuration could also provide for positional adjustment of the mirror support relative to the housing, such as by position adjustment set screws (not shown).

Detector support port 36 is configured and dimensioned to receive the detector and related support structure. A dewar inner stem 56 is seated in the detector support port 36. Hollow beam 28 extends from inner stem 56 across the interior of the housing. As discussed in greater detail below, hollow box beam 28 has legs 27, 29 on either side of the centrally disposed curved detector support arch 26. Stem 56 and hollow box beam 28 are integrally constructed of a material having low thermal conductivity. It is believed that one suitable material is K-650 glass (Kimble Glass Division, Owens-Illinois Glass Company) fused to a metal alloy. One such alloy is a 28% nickel, 18% cobalt, 53% iron alloy known as KOVAR available from Carpenter Technology Corp., Reading, Pa. Inner stem 56 is attached, such as by a fused joint, to an inner stem mount 58 which, in turn, is secured to housing 12, as by stem mount bolts 60. A metal vacuum seal ring 62 provides a vacuum tight seal between inner stem mount 58 and housing 12. Insulated and vacuum tight electrical lead supports 64 extend through the inner stem to provide access into the housing for electrical leads 32. The electrical leads are constructed of very fine wire, having a diameter on the order of about 0.001 inches, in order to minimize any conductive heat transmission to the detector. By way of example only, it is contemplated that the electrical lead supports may also be constructed of a glass/metal alloy combination attached to inner stem mount 58 at a fused joint. Hollow beam 28 extends across the interior of housing 12 with curved detector support arch section 26 disposed at the image surface of focusing mirror 18. The distal end of beam leg 29 is seated in an insulated stem seat 66. Stem seat 66 is also constructed of a low thermal conductivity material, preferably the glass/metal alloy combination previously described above. The stem may be permanently mounted in place, such as by brazing the metal alloy to the housing. It is also contemplated that the tip of distal beam leg 29 and stem seat 66 might be configured to provide positive positional alignment of the inner stem to ensure proper positioning of the detector support arch.

As shown, the interior of stem 56 is configured and dimensioned to receive a cooling assembly, shown in FIG. 1 as a Joule-Thomson cryostat assembly. A cryostat head 68 is seated into the inner stem and supports a coiled section 70 of cryogen feed conduit 30 extending into the inner stem. The distal end of cryogen feed conduit 30 terminates in a small orifice 72 adjacent to the curved detector support arch section 26 of hollow beam 28. A cryogen inlet port 74 communicates with the cryogen feed conduit through cryostat head 68 and provides a means of supplying cryogen, such as high pressure nitrogen gas, to orifice 72 through the cryogen feed conduit. In accordance with known cryogenic cooling methods, high pressure gas expands through orifice 72 and cools hollow beam 28, specifically arched detector support 26, to a very low temperature of about 77° Kelvin. An egress port (not shown) through the coiled section 70 of the feed conduit provides an exit path for used cryogen. An electromagnetic shield 76 is disposed over the inner stem and cryogen feed system, and a cable 78 provides power, as required, for example, to drive scan motor 22.

In the preferred embodiment, focusing mirror 18 has a spherical concave reflective surface, and the scanning mirror 16 is centered at the radius of the spherical mirror. This optical configuration produces a focused image at a curved image surface having approximately one-half the radius of curvature of the spherical mirror. Detector support arch 26 conforms to the curved image surface. Thus, as will be appreciated from FIG. 1, radiation scanned by mirror 16 is directed to spherical mirror 18, which focuses the image onto detector array 20 disposed on the detector support arch 26.

Figure 3:
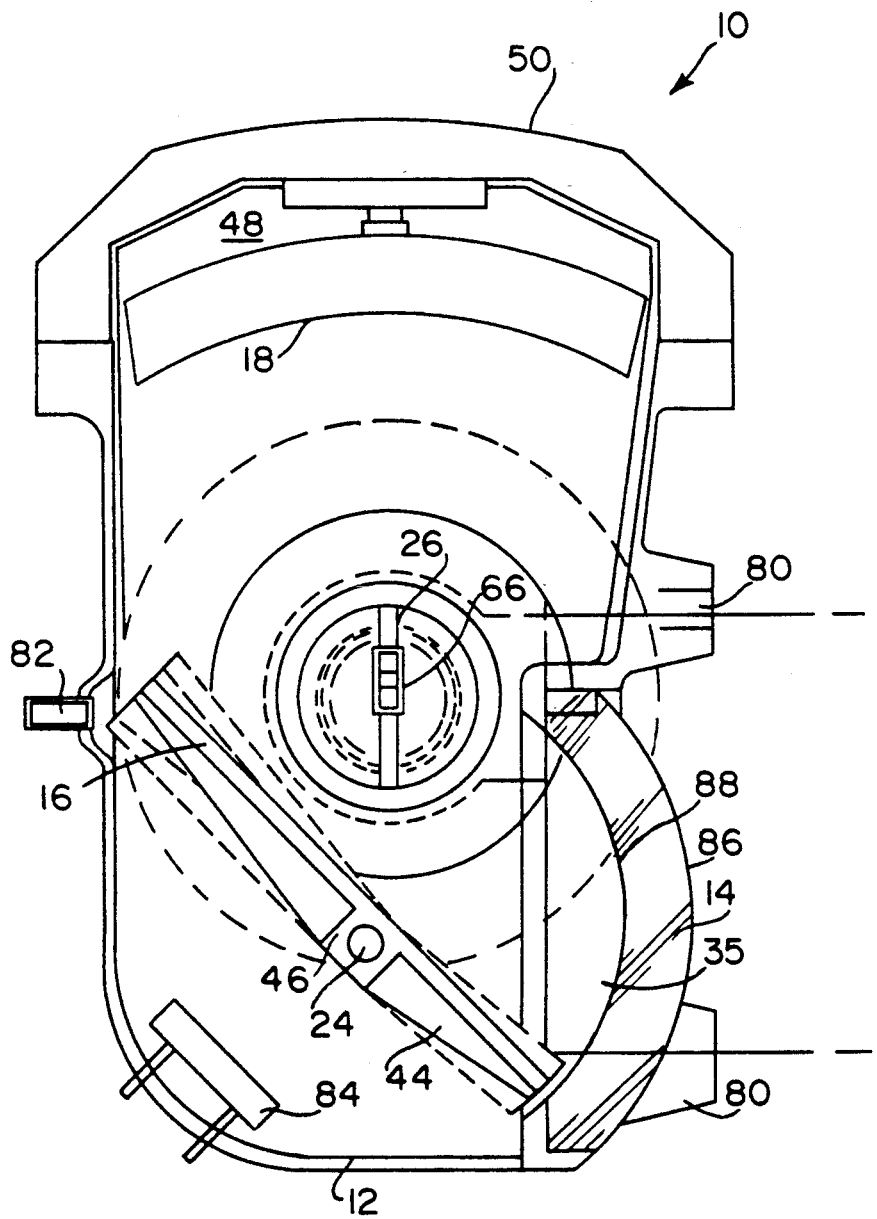
FIG. 3 is a cross-section view of the integrated thermal imager of FIG. 2 taken along lines 3—3 of FIG. 1.

Referring now to FIG. 3, a cross-section view of the system taken along lines 3—3 of FIG. 2, housing 12 includes system mounting surfaces 80 for mounting the system in place, as by bolting. The housing also has a vacuum drawing port 82 for evacuating the interior of the housing. For thermal imaging, a vacuum on the order of about $10^{-6}$ mm Hg is appropriate. Of course, vacuum drawing port 82 must be valved so that the port can be closed and sealed once a vacuum has been drawn. A getter 84 is provided to absorb stray gases in a known manner. Meniscus lens 14 is mounted across a window entrance aperture 35 opposite scanning mirror 16, such as by being fused to the housing with a metal vacuum seal. The meniscus lens must be made of a material which is substantially transparent to the radiation to be detected. One suitable material which is transparent to infrared thermal radiation is germanium.

As illustrated in FIG. 3, meniscus lens 14 has concentric concave surfaces 86, 88. Concentric surfaces 86, 88 are centered on scanning mirror 16 and, more specifically, on the scanning mirror vertex. Focusing mirror 18 is mounted across from scanning mirror 16 at a ninety degree orientation to the incoming radiation through meniscus lens 14. Detector support arch 26 is disposed at the center of housing 12 to support the detector array at the focal surface of the focusing mirror. Scanning mirror 16 is driven by drive shaft 24 in a rotational scanning pattern, rotating approximately plus or minus ten degrees about the axis of drive shaft 24.

Figure 4:
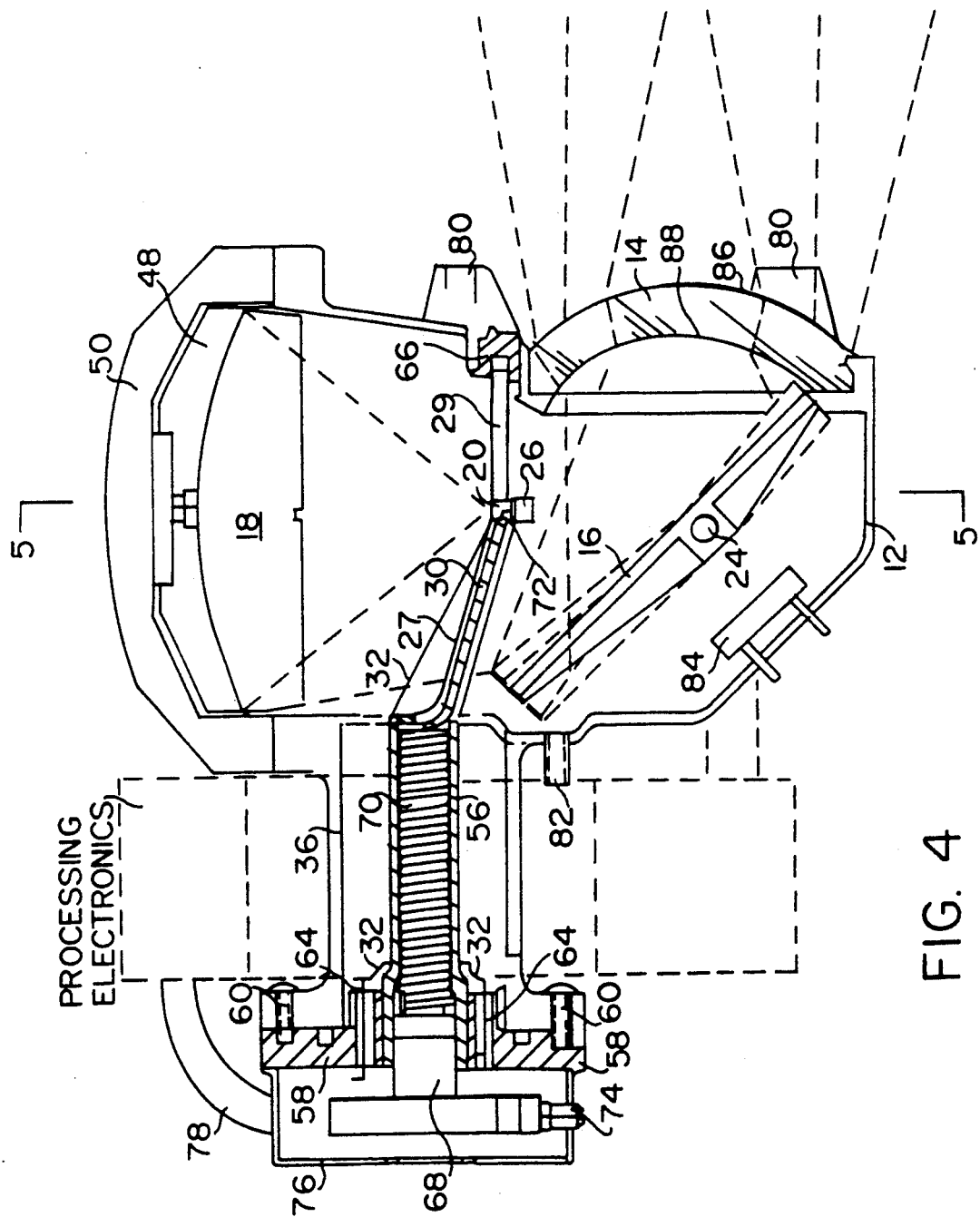
FIG. 4 is a cross-section view of a first alternative embodiment of the integrated thermal imager constructed in accordance with the invention.
Figure 5:
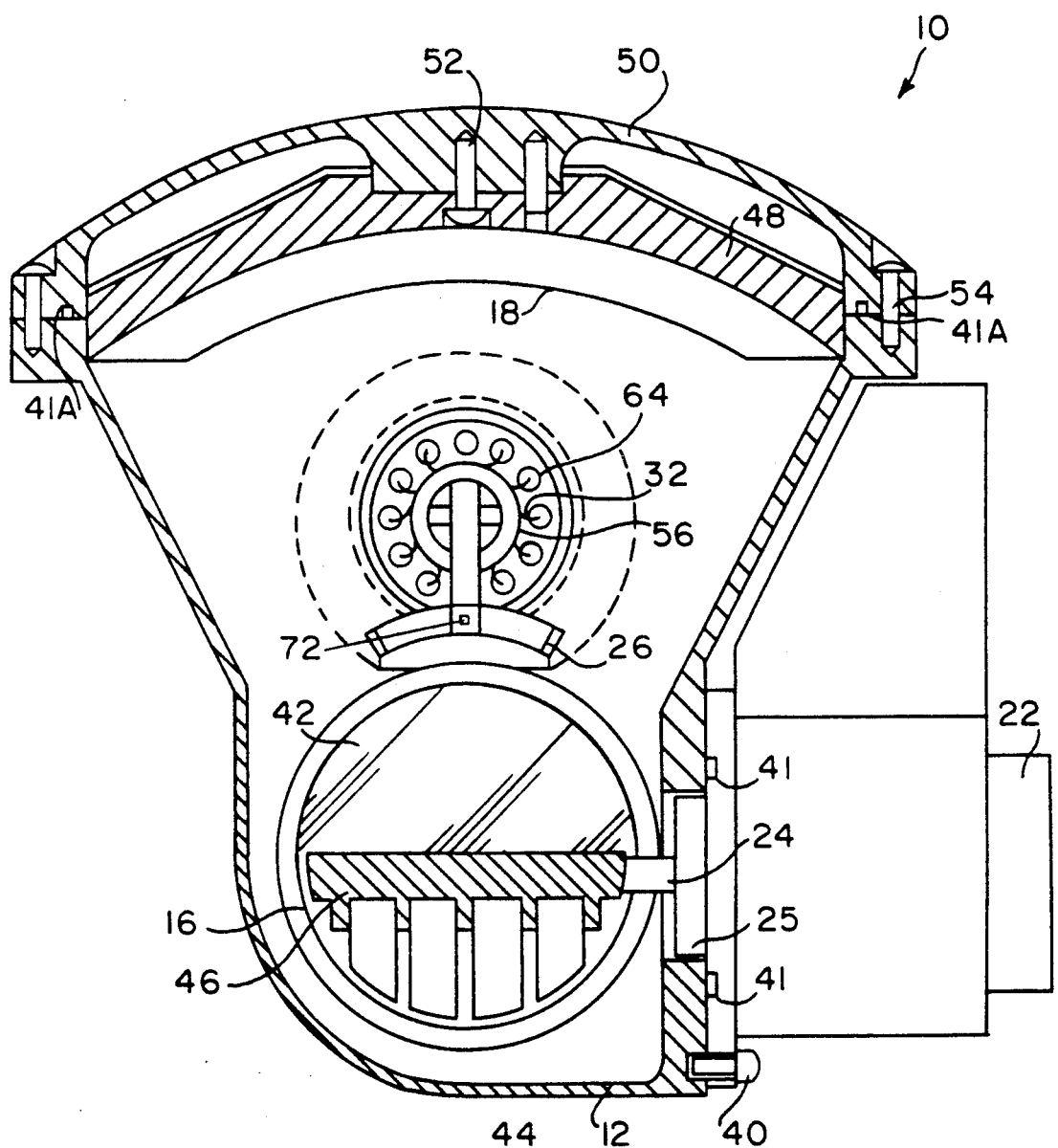
FIG. 5 is a cross-section view of the embodiment shown in FIG. 4 taken along lines 5—5 of FIG. 4.

A first alternative system configuration is shown in FIGS. 4 and 5, using common reference numerals to refer to like elements. As shown in FIG. 4, meniscus lens 14, scanning mirror 16 and focusing mirror 18 are mounted in the same configuration illustrated in FIG. 3. Detector support arch 26 is also mounted in the same orientation to scanning mirror 16 and focusing mirror 18 as described in connection with FIG. 3. However, in this embodiment detector support arch 26 is perpendicularly connected at approximately the mid-point of the arch to the hollow box beam 28 of inner stem 56. Inner stem 56 extends through detector support port 36 and is secured, as by a fused joint, to inner inner stem mount 58 which, in turn, is sealingly mounted to housing 12. Inner stem 56 is made of a low conductivity material, which may also be the glass/metal alloy combination previously described. Here again, hollow box beam legs 27, 29 and support arch 26 may be formed integrally with inner stem 56. As shown in FIG. 4, distal box beam leg 29 extends perpendicularly from detector support arch 26 and the distal end of leg 29 is seated in an insulated stem seat 66, also made of glass/metal alloy to provide minimum conductance. In the embodiments shown in FIGS. 2-5, box beam leg 29 provides further support for the curved arch in order to prevent even slight movement of the curved arch as may occur during some uses. For reasons which will become apparent, leg 29 may not need to be hollow. As in the prior embodiment, a coiled section 70 of cryogen conduit 30 is disposed within inner stem 56 and receives high pressure cryogen gas through an inlet port 74 in cryostat head 68. Coiled conduit section 70 feeds the cryogen to orifice 72 at the tip of cryogen conduit 30. Orifice 72 is disposed in close relation to curved detector support arch 26 to provide cryogenic cooling. The details of cryogenic cooling will be discussed in greater detail below. Electrical leads 32 are led from the detector along the surface of inner stem 56 and through insulated static vacuum seals 64. In one embodiment optional processing electronics (shown in phantom) may be mounted to the external housing surface in order to perform at least some processing.

FIG. 5 is a cross-section view of the intergrated thermal imager shown in FIG. 4 taken along lines 5—5. In accordance with this embodiment, detector support arch 26 is mounted perpendicularly to inner stem 56. A number of detector electrical leads 32 are shown mounted through insulated vacuum seals 64. The electrical leads travel along inner stem 56 to curved detector support arch 26, where they are connected to the detector array in an appropriate manner. As discussed in greater detail below, time delay and integration and multiplexing functions, and perhaps other functions as well, preferably are performed on the focal surface, so relatively few electrical leads are required to handle a large amount of information transmitted in serial fashion from a high density detector array.

As stated, the preferred primary or focusing mirror 18 is a spherical concave mirror. When an aperture stop is placed at the center of curvature of such a mirror the imaging characteristic of the spherical mirror is such that the image is formed at a location in space that is spherical. In the present invention, scanning mirror 16 preferably is disposed at the center of curvature of spherical focusing mirror 18 and approximates an aperture stop by limiting the ray bundle sizes for all field angles. Focusing mirror 18 forms a spherical image having a radius equal to approximately one half the radius of curvature of the spherical mirror. It is also preferred that meniscus lens 14 have concentric surfaces and that the scanning mirror be disposed at the center of curvature of the meniscus lens surfaces. It is further preferred that the meniscus lens constitute the dewar housing window. It is contemplated, however, that the meniscus lens also could be disposed between the scanning mirror and the primary or focusing mirror, but such a configuration would require a separate dewar window and, for this and other reasons, is less preferred. One foreseeable advantage of mounting the meniscus lens between the scanning mirror and spherical mirror is that the scanning mirror and the associated drive system can be mounted outside the dewar housing. Preferably, the detector array is mounted on a curved detector support arch having a radius of curvature which conforms to the radius of the spherical image formed by the focusing mirror, so that the detector array lies on and receives a slice of the image. This unique optical configuration results in an image which is in focus for all points in the field of view of the image strip received by the detector array. Residual aberrations are also uniform and of negligible magnitude.

In use, at any given moment in time focusing mirror 18 receives light bundles from the scanning mirror which have originated at every point along a vertical strip of pixels in the scene (not shown), and focuses the light bundles onto the detector array on the curved support arch. A small rotation of the scanning mirror by drive motor 22 and drive shaft 24 sets up the adjacent vertical strip of pixels in the scene for imaging onto the detector by the focusing mirror. In this manner the entire object field is scanned one vertical slice after another. After a full scan is completed the scanning mirror is driven so as to cause the scanning mirror to "fly" back to its original position to commence a scan of the next frame of the image.

Figure 6:
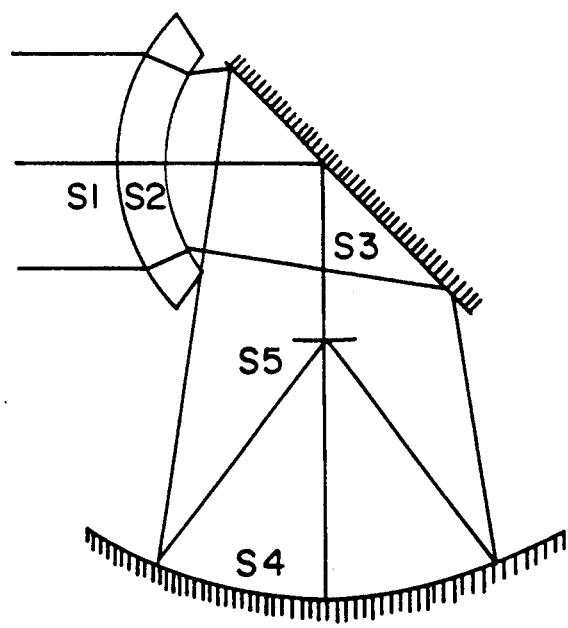
FIG. 6 is a ray diagram of the preferred integrated optical system of the thermal imager in accordance with the invention.

A particularly preferred embodiment of the optical system has the characteristics described in Table I, with reference to FIG. 6, a ray trace diagram of the preferred system including a meniscus lens with concentric surfaces centered on the scanning mirror vertex, a spherical imaging mirror also centered on the scanning mirror and a curved image surface.

TABLE I

| Surface | Radius(mm) | Thickness(mm) | Glass/Medium |
|---------|------------|---------------|--------------|
| S1 | 28.731 | 6.464 | germanium |
| S2 | 22.266 | 22.266 | air |
| S3 | Infinite | 61.644 | mirror |
| S4 | 61.677 | 36.642 | mirror |
| S5 | 25.002 | 0 | focal surface |

Performance parameters for the system described above are set out in Table II.

TABLE II

| Entrance pupil diameter | 30 mm |
|---|---|
| Wavelength band | 8 to 12 microns |
| Focal length | 25 mm |
| F/number | .83 |
| Field of view | 24° |

The foregoing system illustrates the performance which may be accomplished with the present invention. However, it is also contemplated that any particular performance parameter can be further enhanced, albeit with a corresponding decrease in performance with respect to one or more other parameters. For example, a very fast relative aperture of f/0.7 is acheivable for a more restricted field of view, or a wider field of view, on the order of 40°, is attainable for a smaller relative aperture. The limiting factor in the system is the scanning mirror, which can become prohibitively large and prevent folding of the line of sight because of interferences with the window and optical telescope.

Figure 7:
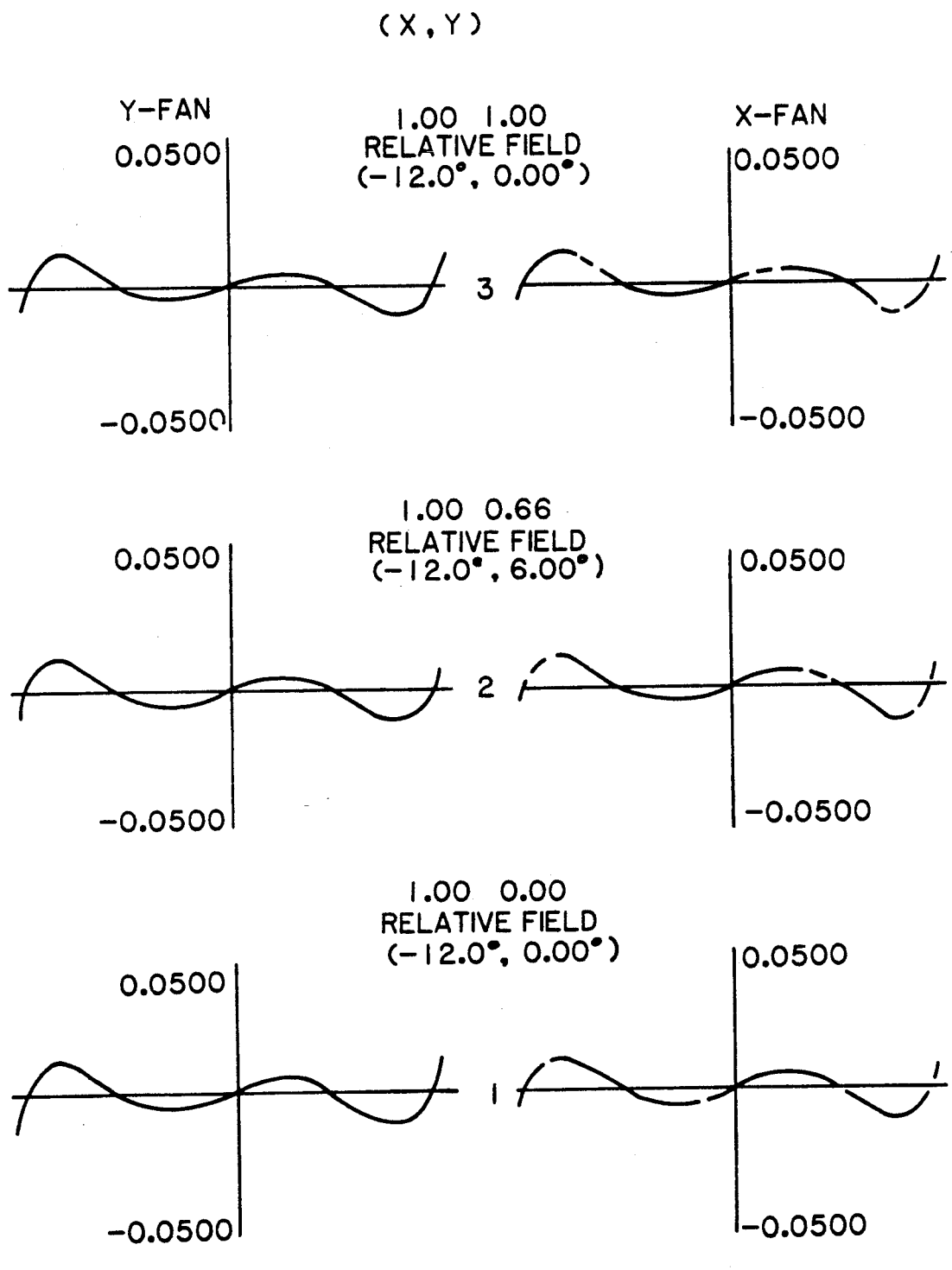
FIG. 7 is a plot of the residual aberrations and diffraction of the optical system illustrated in FIG. 6.

The image quality of the system constructed in accordance with the present invention is determined by the residual aberrations and diffraction. FIG. 7 is a plot of the residual aberrations of the system shown in FIG. 6 and described above with reference to Tables I and II, modeled on a VAX 8330 computer using the CODE V optical design program. The three sets of curves there shown depict the residual transverse ray aberrations at the focal plane for three points within the field of view. The bottom set represent the center of the field, the middle set of traces represent two-thirds field zone, and the top set of traces represent the very edge of the field. Symmetry of the system permits these curves to be fully representative of the image format. The left and right hand curves provide aberration data for the meridional and saggital ray fans, and the broken-lines and solid lines represent the different wavelengths within the spectral band.

Figure 8:
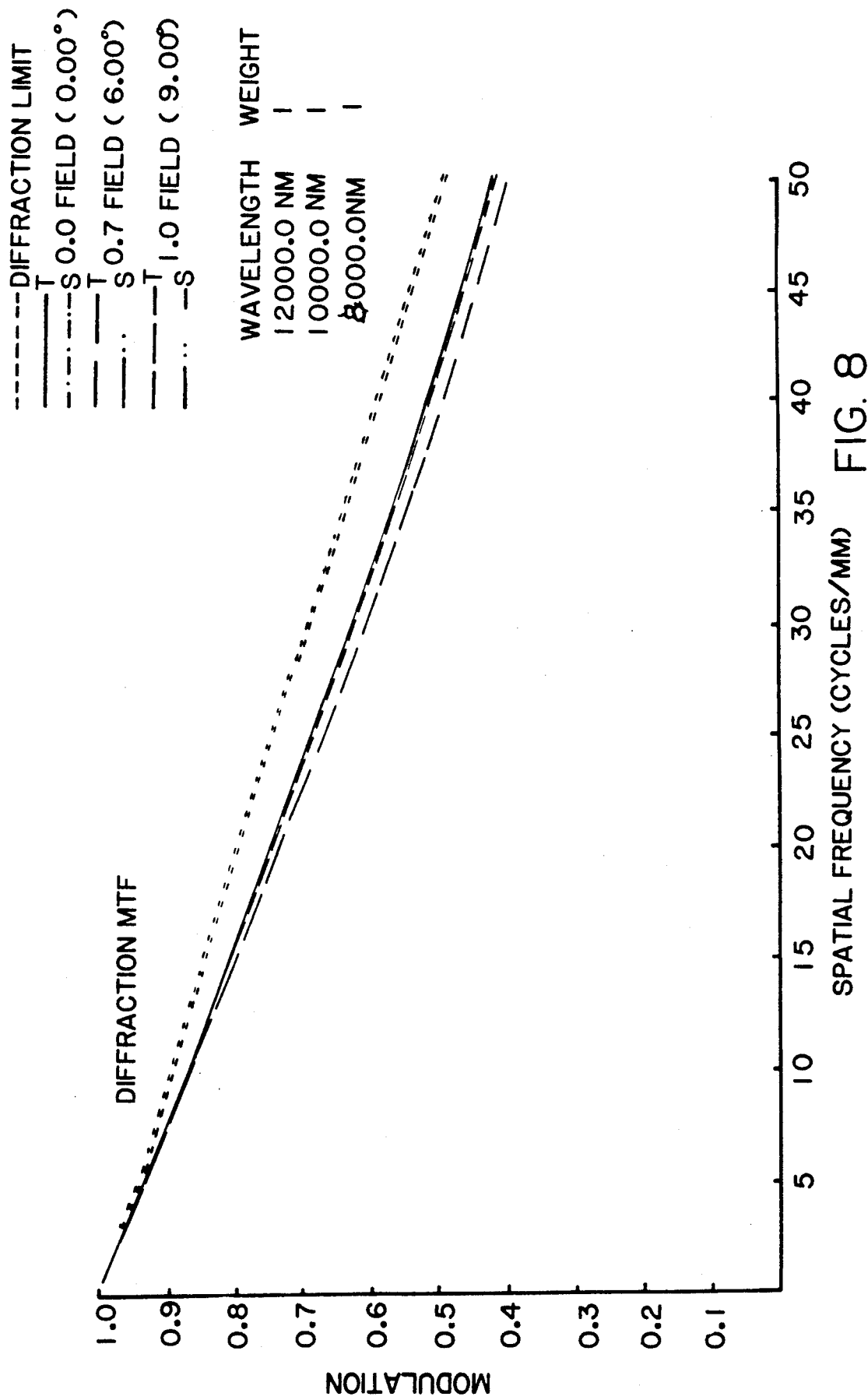
FIG. 8 is a plot of the diffraction modulation transfer function of the optical system illustrated in FIG. 6.

Analysis of the curves of FIG. 7 yields the following: (1) the curves are identical, indicating that image quality is invariant across the field of view and that no astigmatism or other off-axis aberrations are present; (2) the curves depart from the ideal perfectly straight line by about 10 microns of zonal spherical aberration, which is much smaller than the size of the detector element representing the scene pixel element being imaged; and (3) all three wavelengths are coincident, indicating total freedom from chromatic aberrations across the field. Image quality expressed in terms of modulation transfer function is illustrated in FIG. 8. The proximity of the curves to the diffraction limit reference curve indicates that the system is nearly perfect. Further, this high state of quality is achieved at a very large relative aperture, f/.83, which means that the system is simultaneously extremely effective radiometrically.

Prior thermal imaging systems utilize planar detector arrays since planar detector arrays are current state of the art, and prior optics are designed to form an image on a plane surface. In contrast, the present invention forms an image on a curved, preferably spherical image surface and detects a slice of the image formed on the curved surface. In order to accomplish this result several novel detector arrangements are contemplated.

Figure 9:
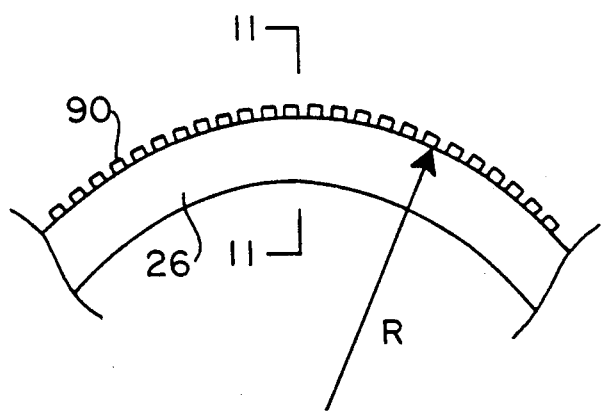
FIG. 9 is a partial, enlarged plan view of a curved detector support arch with outwardly facing detector elements.
Figure 10:
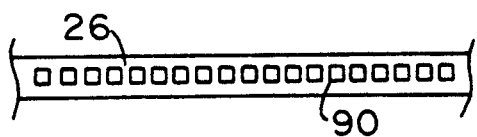
FIG. 10 is an elevation view of the detector arrangement shown in FIG. 9.
Figure 11:
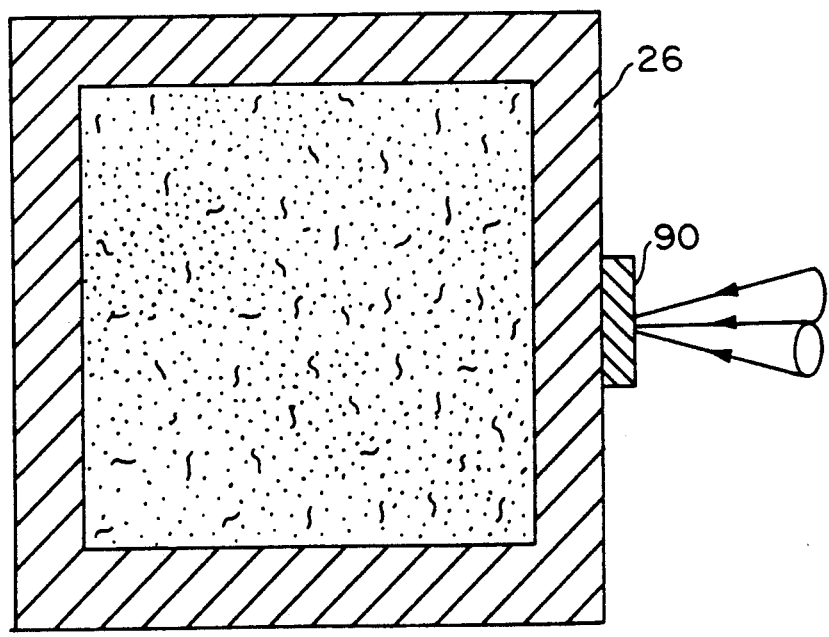
FIG. 11 is a cross-section view taken along lines 11—11 of FIG. 9.

FIGS. 9-11 illustrate in enlarged detail one form of a curved detector array on a curved detector support arch in accordance with the invention. In FIG. 9, R indicates the radius of curvature of the detector surface of support arch 26 which approximates the curvature of the spherical image. Individual detector elements 90 are mounted on and are supported by support arch 26 with the detector elements facing outwardly from the curved arch surface toward the focusing mirror. Because the support arch radius R approximates the radius of curvature of the curved image formed by the focusing mirror, e.g. a spherical image, the detectors are disposed on a slice of the curved image. FIG. 10 is an elevation view of the detector array configuration of FIG. 9, and FIG. 11 is a cross-section view taken along lines 11—11 of FIG. 9, showing one detector element 90 mounted on the support arch 26. FIG. 11 illustrates the hollow box beam construction of the detector support arch. Configuring the detector support as an arch with the detectors disposed on the curved image surface advantageously allows the ray cones from the focusing mirror to strike each detector squarely, perpendicularly and identically for every detector element regardless of position in the array. In accordance with further aspects of the invention, additional ways in which current detector manufacturing technology can be employed to approximate or achieve exactly a desired curved detector array are contemplated and are disclosed below.

Figure 12:
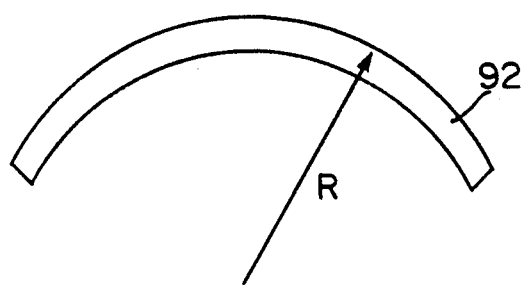
FIG. 12 is a top plan view of a curved strip mirror.
Figure 13:
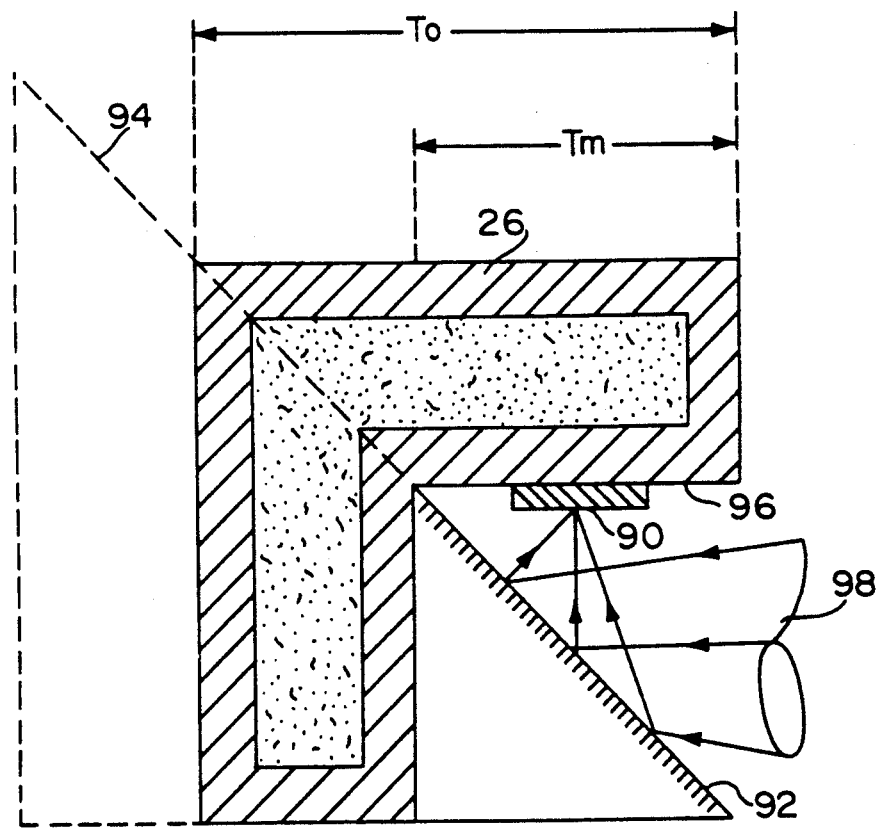
FIG. 13 is an enlarged cross-section view of an alternative detector arrangement including a strip mirror.
Figure 16:
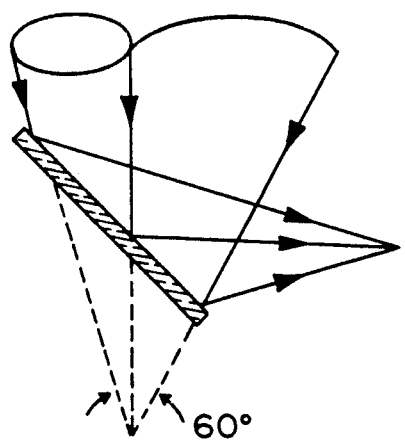
FIG. 16 is an illustration of an intermediate ray cone folded 90°.
Figure 14:
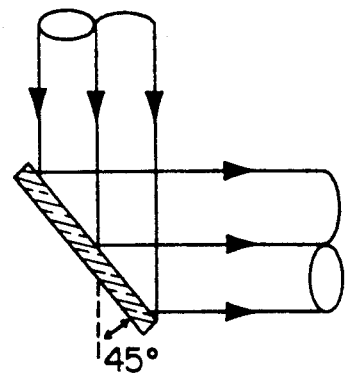
FIG. 14 is an illustration of a collimated beam folded 90°.
Figure 17:
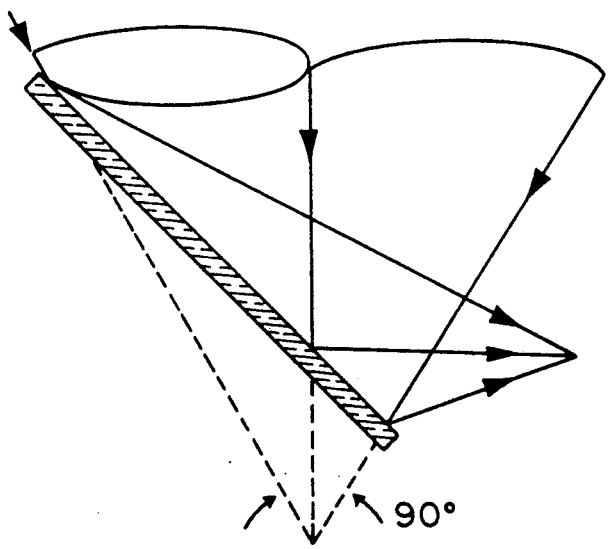
FIG. 17 is an illustration of a large ray cone folded 90°.
Figure 15:
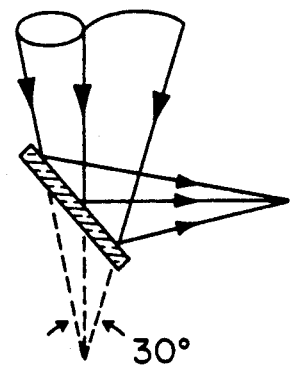
FIG. 15 is an illustration of a small ray cone folded 90°.

An alternative detector and support configuration is illustrated in FIGS. 12 and 13. This embodiment employs a strip mirror 92 shown in plan view in FIG. 12. Preferably, strip mirror 92 is a sliver cut from a right circular reflective cone, and has a radius which approximates the radius of curvature R of the curved image surface. FIG. 13 is an enlarged cross-section view of strip mirror 92 mounted to a curved detector support arch 26 having an L-shaped cross-section configuration. Strip mirror 92 faces the focusing mirror. In FIG. 13, the right circular cone 94 from which strip mirror 92 was cut is shown in phantom. It is further preferred that the strip mirror be cut from a right circular cone having a 45° half angle and an axis which coincides with the scanning mirror vertex and is perpendicular to the plane of FIGS. 3 and 4. If strip mirror 92 is relocated slightly toward the focusing mirror, then each pixel image produced by the focusing mirror will fall on a plane located just above the intersection point of each pixel with the strip mirror. The planar image of the pixels will be curved, but all detector entrance surfaces will lie in a plane above the strip mirror. As shown in FIG. 13, the strip mirror is mounted in the rectangular open area defined by the preferred support arch having an L-shaped cross-section, such that the back of the strip mirror is mounted against one leg of the L-shaped support. The strip mirror reflects each pixel image at approximately 90° toward the overhanging detector support surface 96 on the other leg of the L-shaped arch support. The detectors are disposed on the overhanging detector support surface along a curve corresponding to the curve of the strip mirror. Thus, in this embodiment the image cone 98 from the focusing mirror (not shown) is folded approximately 90° and comes to a focus on a curved plane surface directly above strip mirror 92. This permits the use of a planar, albeit curved, array of detector elements corresponding to the curve of the planar image. While the configuration of FIG. 13 provides a flat detector plane, it requires that the optical ray bundle or "cone" of rays to be folded. The principle of optical folding and the drawbacks and limitations of folding the image cones in the present invention are best understood with reference to FIGS. 14–17. These Figures show that geometry limits the size of the ray cone or bundle which can be folded. The faster cones, i.e., those with larger cone angles, require correspondingly larger folding mirrors. FIG. 14 illustrates a collimated beam folded 90°. FIG. 15 shows a ray bundle having a small cone angle, i.e., 30°, folded 90°. FIG. 16 shows a ray bundle having an intermediate-sized cone angle of 60° folded 90°, and FIG. 17 shows a ray bundle having a large cone angle of 90° folded 90°. FIGS. 14–17 illustrate that as the convergence angle of the ray bundle increases the size of the required fold mirror also increases. Further, there is a theoretical limit for the cone angle of 90° for fold conditions of 90°.

The irradiance at the detector depends in part on the size of the ray bundle incident on the detector. A "fast" lens system is one in which a large amount of light reaches the focal surface. In this case, a fast system is one which has a relatively large ray bundle cone angle at each detector. Adopting photographic terminology, the "speed" of the optical system of the invention may be expressed as the "f/number" of the system. A fast system which has a large ray cone angle has a small f/number. Particularly in thermal imaging, it is highly desirable to provide an optical system which has a very small f/number, on the order of f/1.0 or f/0.75, in order to maximize the irradiance at the detector.

In general, the irradiance at the detector H is defined by Equation 1:

$$H = NT\Omega \quad (1)$$

where N is the radiance of the scene, T is the transmission of the optics, and $\Omega$ is the solid angle of delivery of rays at the detector. $\Omega$ is related to the f/number of the system by Equation 2:

$$\Omega = \frac{\pi}{4(f/no.)^2} \quad (2)$$

Substituting for $\Omega$ in equation (1), the irradiance at the detector can be expressed as follows:

$$H = \frac{\pi NT}{4(f/no.)^2} \quad (3)$$

Equation (3) makes it is evident that small f/numbers, i.e., large ray bundle cone angles, are very desirable in order to acheive the highest possible detector irradiance and, hence, the largest possible detector output signals.

In the detector support embidiment including a strip mirror, the strip mirror acts as a fold mirror to fold the ray cone approximately 90° toward the flat surface detector array. Large fold mirrors, i.e., the strip mirror in this case, cannot be tolerated in the present system because the detector support, detector and mirror create an obscuration in the optical path of the system. Obscurations which do not exceed 5 to 10% of the aperture may be tolerable, but larger obscurations will most likely begin to significantly impact on the irradiance at the detector by blocking out rays. FIG. 18 illustrates the obscuration created by the detector support and strip mirror as the obscuration would appear when viewed through the meniscus lens. As shown, the detector support and the strip mirror create an obscuration 100 and allow light in the surrounding area 102 to reach the focusing mirror and be focused onto the detector array. Another reason it is desirable to minimize obscuration is the effect such obscuration has on the modulation transfer function (MTF). That is, the MTF of the system degrades in proportion to the size of the obscurations. Stated differently, in reproducing the scene as a displayed image the contrast rendition ability of the system degrades as the obscuration increases. In the case of a scene having very low contrast, information may be lost totally.

As stated, both the strip mirror and the detector support contribute to image obscuration. In this embodiment the relative contibutions of the detector support and strip mirror can be understood with reference to FIG. 13. As there illustrated, the overall thickness of the strip mirror and detector support $T_o$ is larger than the thickness $T_m$ required for the strip mirror alone. As will readily be appreciated, the thickness of the detector support and strip mirror also exceeds the thickness of the detector support alone in the prior embodiment wherein the detectors are mounted directly on the curved surface of the detector support facing the focusing mirror (see FIG. 11). The curved detector focal surface, i.e. the curved image, represents an improvement allowing much smaller f/numbers and smaller obscurations. The flat surface detector arrangement including a strip mirror creates greater obscurations, but may be more readily manufacturable at acceptable cost using existing detector manufacturing technology and equipment.

In the context of image obscuration, the detector stem configuration of the embodiment illustrated in FIGS. 4 and 5 may be preferable to the configuration illustrated in FIGS. 2 and 3. In the embodiment shown in FIG. 2, the legs 27, 29 of hollow beam 28 contribute to obscuration 104 of the image as explained above with reference to FIG. 18. This is due to the fact that a portion of the linear image strip being focused by the focusing mirror onto the detector at any given point in time is obscured, in part, by legs 27, 29. In the embodiment shown in FIGS. 4 and 5, however, the portion of the linear strip of the image being focused at any given point is obscurred only by the arched detector support 26, and the perpendicular legs 27, 29 of hollow beam 28 do not contribute to obscuration of the linear image being detected.

Figure 20:
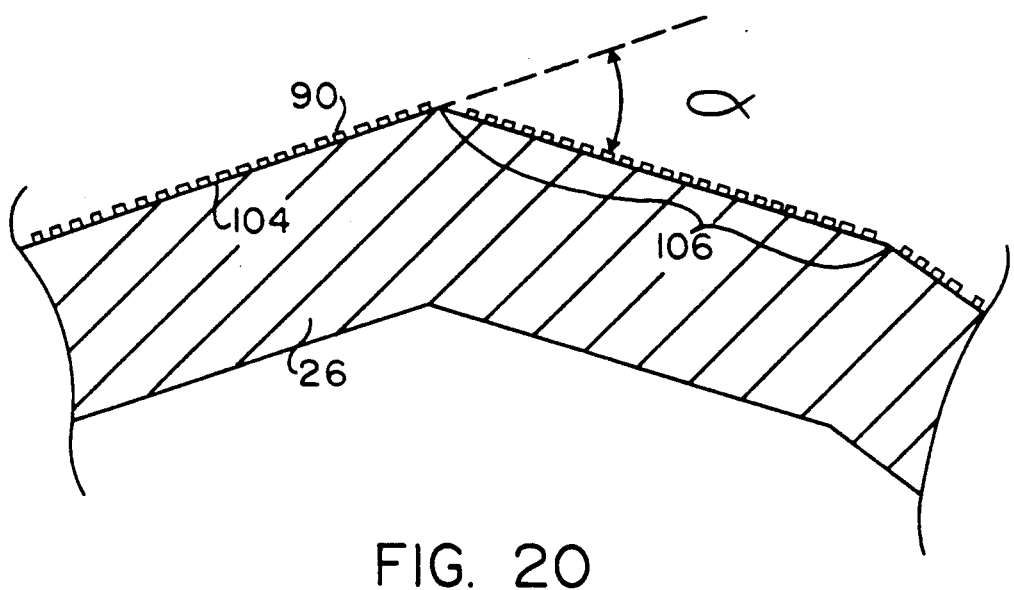
FIGS. 19 and 20 are enlarged partial plan views of an alternative detector arrangement having polygon surfaces.
Figure 19:
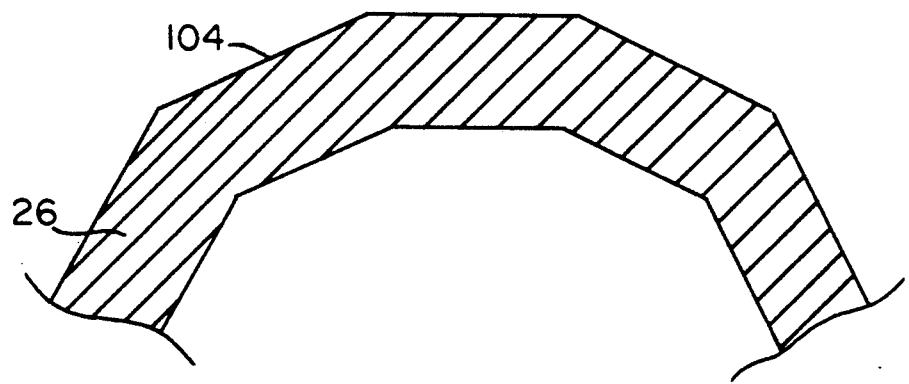
Figure 21:
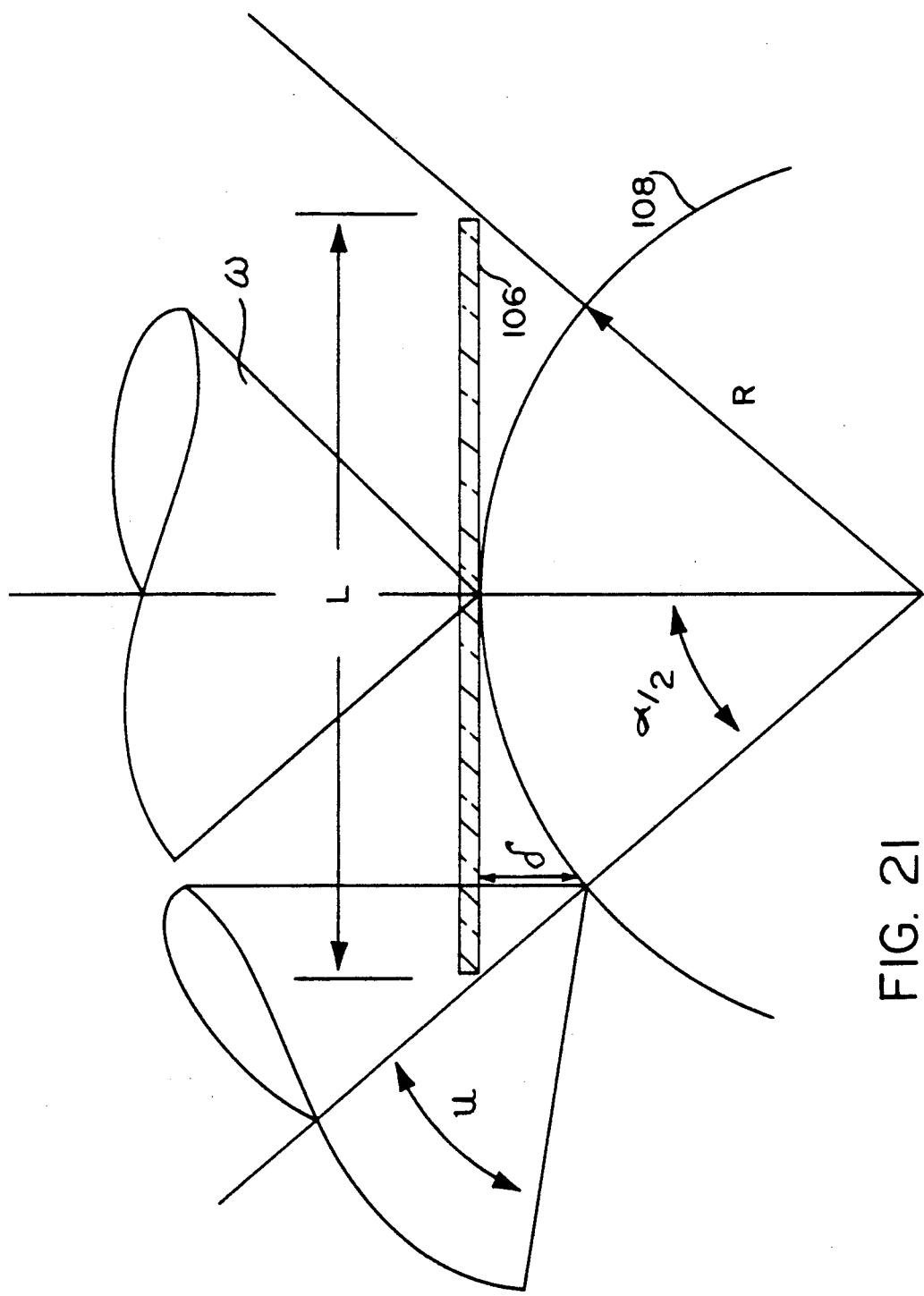
FIG. 21 is an enlarged illustration of one detector segment in accordance with the detector arrangement of FIGS. 19-20 relative to the ideal curved image surface.

A further alternative embodiment of the invention approximates the curved detector surface with a polygon surface, as shown in FIGS. 19 and 20. In this embodiment, a number of short flat-surfaced polygon sides 104 which are angled with respect to each adjacent polygon side support flat detector segments 106. Thus, a curved detector surface is approximated with planar detector technology. The number of polygon sides N which would satisfactorily approximate the ideal curvature of the preferred spherical image surface is determined from optical considerations of the system. The principal consideration is the amount of defocus incurred across the planar detector segment 106 of the detector array. That is, the longer the flat detector segment, the further at least a portion of the segment will depart from the ideal curved image surface 108. This is illustrated in exaggerated detail in FIG. 21, where the center of one detector segment 106 is shown disposed at a point on the ideal curved image surface 108. The amount of defocus δ at any point on the detector segment is represented by the distance that portion of the detector segment deviates from the ideal curved surface. The amount of defocus which can be tolerated depends on the f/number of the image forming cone W and the wavelength of the light forming the image. The defocus also depends upon the amount of image degradation which can be tolerated in any particular application. Typically, a defocus of ¼ wave in the wavefront represents a general limit. The defocus preferably is no more than about half this amount so as not to consume the entire wavelength error budget in one area of the system. Furthermore, a ¼ wavefront error represents significant modulation transfer function degradation in the mid-frequency range. Preferably, the defocus δ should be kept under ⅛ wavelength. Keeping all this in mind, the wavefront error, or optical path difference ("OPD") can be calculated as follows:

$$OPD = \tfrac{1}{2} N \delta \sin^2 U \quad (4)$$

where U is the half angle of the image forming cone of rays, N is the refractive index of the medium in which the image is being formed and δ is the focus shift, i.e., the defocus.

Allowing OPD to be ⅛ of a wavelength of light, N to be 1.0 and assuming U equals 30° (f/1.0), solving for the allowable defocus yields, $$\delta = \frac{2(OPD)}{\sin^2 U} = \frac{2(\lambda/8)}{\sin^2 30} = \lambda \quad (5)$$

Therefore, at λ=10 micrometers the allowable defocus δ is 10 micrometers.

The sag of the arc which approximates the defocus at small angles α (see FIG. 20) is given by:

$$\delta \approx \frac{(L/2)^2}{2R} \quad (6)$$

where R is the radius of the image and L is the detector segment length.

Therefore, the maximum length of the detector segment L is given by:

$$L = (8R\delta)^{\tfrac{1}{2}} \quad (7)$$

By way of example, in a system where the ideal image surface radius R is 25 mm, and the allowable defocus δ and wavelength λ are 10 micrometers, i.e., 0.010 mm, the polygon angle α is 3.2° and 112.5 facets would be required to approximate the entire 360° of a circular image. For a field of view of 25°, 7.8 detector segments will give a 25.6° field of view.

In yet a further detector support embodiment, it is contemplated that the detector array may be formulated as an integrated circuit upon a flexible substrate which exhibits the required electrical, mechanical and thermal properties. The flexible substrate is cemented or otherwise secured to the preferred curved detector support arch.

Advantagously, the optical system of the present invention exhibits a condition known as telecentricity. This condition is manifested by the ray cones at the focal surface, i.e. the spherical image, being perpendicular to the focal surface for all points in the field of view. This principle is illustrated in FIG. 22 for a plane focal surface and in FIG. 23 for a curved focal surface. Telecentricity is desirable in a thermal imaging system because it provides uniform detector irradiation and, hence, uniform detector response for all detectors in the detector array of the present system. Uniform detector irradiation and response results in uniform brightness in the displayed image. By way of illustration, deviations from perpendicular irradiance are shown in FIG. 24, with the deviation from the normal expressed as the angle θ. Deviations of this type typically give rise to a cosine function fall-off in irradiance, which may be $\cos^2 \theta$, $\cos^3 \theta$, or $\cos^4 \theta$ in some systems.

Telecentricity is also desirable in relation to another consideration unique to thermal imaging, that is, "cold shielding." In thermal imaging cold shielding is necessary to prevent ambient thermal noise from reaching the detector. The principle of cold shielding, as illustrated in FIGS. 25 and 26, is to minimize the field of view of the detector using an aperture plate 110 disposed in front of the detector 90 so that the detector can "see" only radiation originating from the scene being scanned, and not spurious radiation originating from sources outside the scene or which may be reflected from interior housing surfaces. Aperture plate 110 typically is cooled to a reduced temperature, such as by using the same cryogenic cooling system as is used to cool the detector to about 77° Kelvin. As shown in FIGS. 25-26, the field of view of the detector would be exactly equal to the width of the image cone W if the detector were a single small element 90 and if the ray cones for all field positions were coincident. These conditions can be approached by a simple, serial scan infrared thermal imaging system, but usually cannot be attained in parallel scan or staring array infrared imagers. This is due to a number of factors, including (1) the geometry of the detector array, i.e. the detector array dimensions, (2) the aspect ratio, size and direction of the incident ray cones, and (3) cold shield size, shape, and location restrictions. Referring now to FIGS. 27 and 28, in a parallel scan system having a linear detector array the cold shield aperture plate 112 defines a rectangular aperture associated with the linear detector array which is geometrically larger than the desired image cone diameter W. This allows non-perpendicular ray cones 114 to reach and be detected by the detectors.

Because of the highly desirable telecentricity of the optical system of the present invention, the invention further includes individual cold shields for each detector. By providing individual cold shields for each detector element in the array, the preferred embodiment is able to achieve better performance over conventional over-sized cold shields of the type shown in FIGS. 27 and 28.

Figure 31:
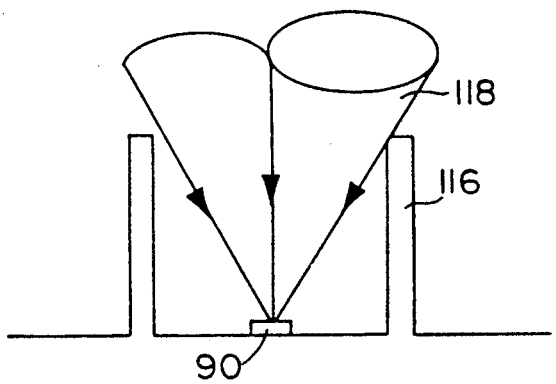
FIGS. 31 and 32 illustrate telecentric and non-telecentric image cones and resultant image shading.
Figure 32:
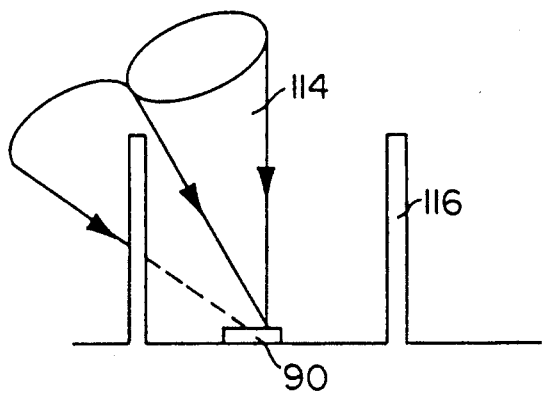
Figure 29:
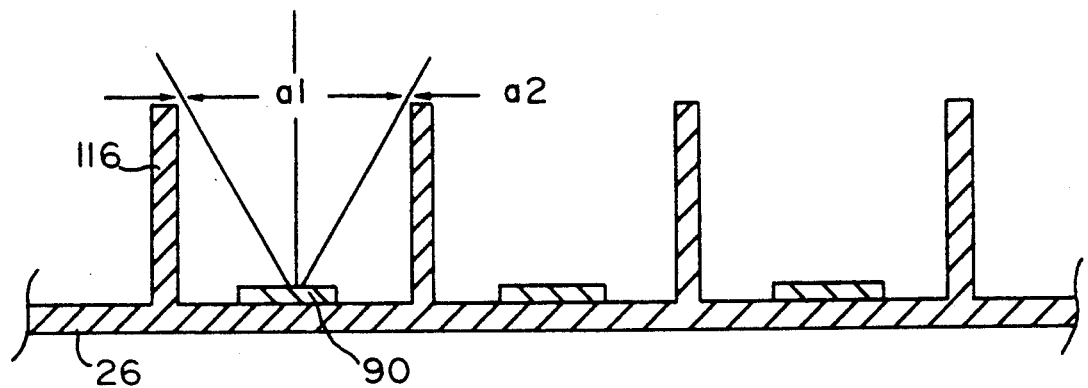
FIGS. 29 and 30 are partial cross-section and plan views, respectively, illustrating detector elements provided with individual cold shielding in accordance with the invention.
Figure 30:
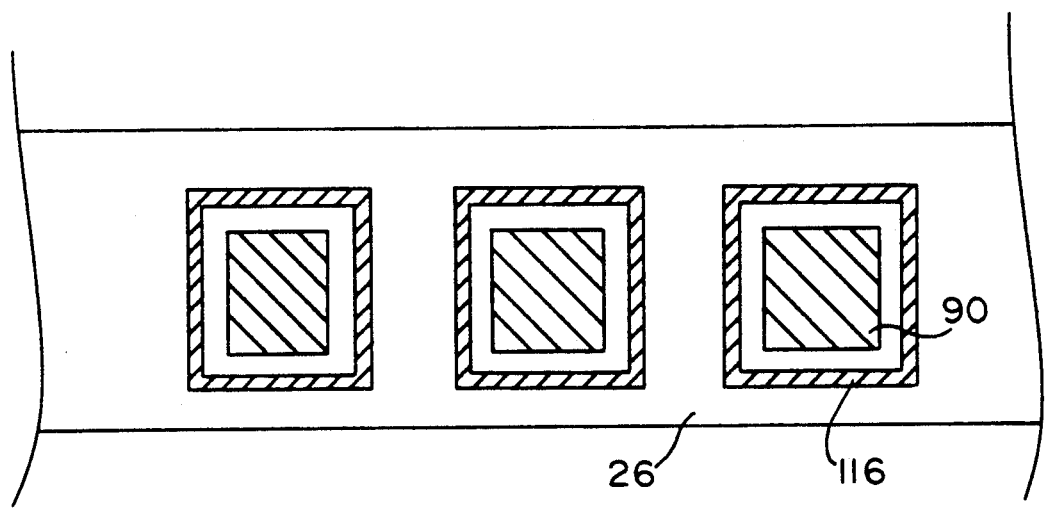

FIGS. 29 through 33 are enlarged views of individual detector elements of the present invention including individual cold shielding. As shown in FIGS. 29 and 30, enlarged partial cross-section and plan views, respectively, of individual detector elements 90 and associated cold shields 116, the desired configuration is acheived by making the image cone solid angle a1 identical to the solid angle a2 subtended at the detector 90 by the individual cold shield 116. As shown in FIGS. 29 and 30, the individual cold shield walls extend perpendicularly from the detector support surface to define such a cold shield angle. Because the image in the present system is telecentric for all points in the field of view individual cold shields can be provided for all detector elements in the array to match the pixel solid cone angle with the cone angle viewed from each detector element. This preferred cold shield geometry also provides an increase in detector sensitivity which is inversely proportional to the square root of the size of the cold shield solid angle. Thus, if the solid angle of the cold shield (see FIG. 29) is one-half the size of the conventional cold shield solid angle (see FIGS. 27 and 28), then the detector sensitivity would improve by a factor equal to the square root of two. In contrast, as illustrated in FIGS. 31 and 32, if the image were not telecentric for all points of view individual cold shielding could not be used because shading would result and imaging performance would be reduced. FIG. 31 illustrates a telecentric image cone 118 whereas FIG. 32 illustrates a non-telecentric image cone 120 wherein a portion of the image cone is shaded by cold shield 116.

Figure 33:
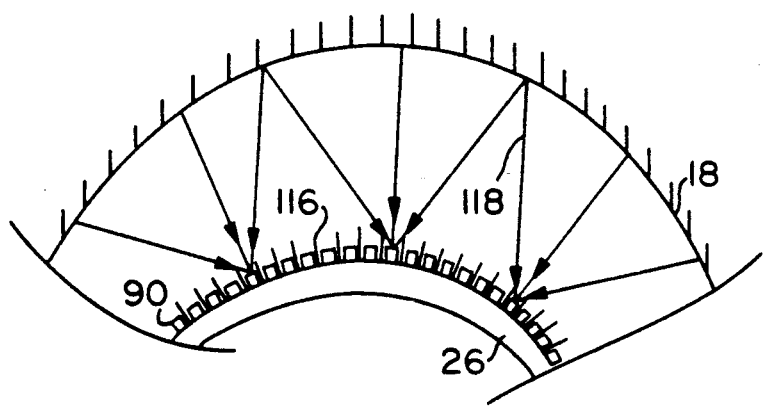
FIG. 33 is a partial plan view illustrating telecentric imaging from the focusing mirror onto individually shielded detector elements.

Referring now to FIG. 33, the telecentric imaging of the present invention is illustrated. In accordance with the preferred embodiment of the invention, each detector element 90 is provided with individual cold shielding 116. Due to the desirable telecentric imaging of focusing mirror 18, the geometry of the telecentric ray cone 118 relative to detector 90 and cold shield 116 is identical for all field angles, and optimum cold shielding and detector performance is effected.

In order to yield maximum sensitivity to incident photons, the detectors, which typically are photoconductive or photovoltaic mercury cadmium telluride, must be thermally isolated and cryogenically cooled to approximately 77° K. Thus, the detector must be refrigerated and thermally isolated from extraneous potential sources of heat, such as the housing. In the present invention the preferred glass/metal alloy construction of the hollow box beam and stem mount effectively accomplish thermal isolation. The detector substrate material should also exhibit high thermal conductivity and low specific heat capacity characteristics. Generally speaking, in thermal imaging systems the detector is refrigerated by contact with a cryogenic coolant or a cold finger, depending upon the type of cooling system used.

Figure 34:
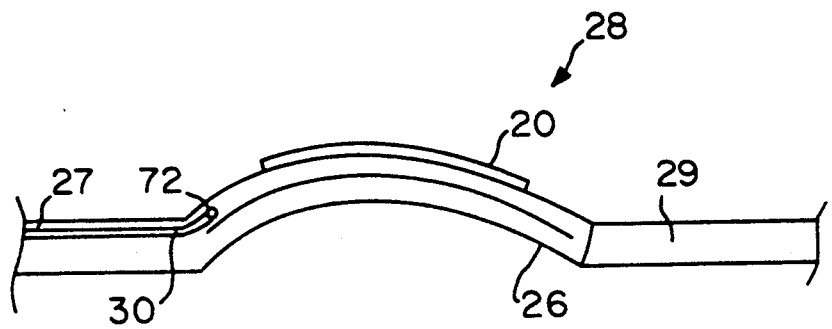
FIG. 34 is a partial cross-section view of the hollow box beam detector support illustrating cryogenic cooling of the detector.
Figure 35:
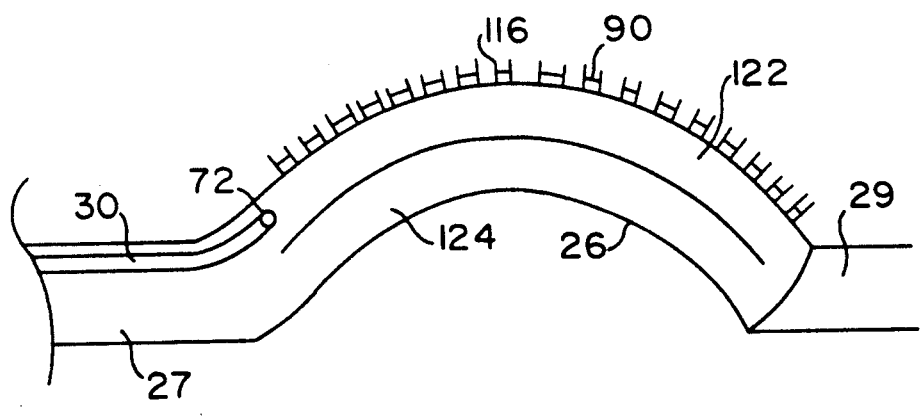
FIG. 35 is an enlarged partial cross-section view of the detector support arch further illustrating cryogenic cooling.

One common approach to cryogenic cooling is to allow a cooled gas to contact the detector. Referring to FIGS. 34 and 35, in the present invention the hollow beam support arch 26 (see FIGS. 2 and 5) can serve as the conduit for conveying the cooled gas to the detector array. In this approach, gas under high pressure, such as liquid nitrogen, is forced through the cryogen conduit 30 and is allowed to expand through a small orifice 72 into the hollow box beam, the interior of which is isolated from the vacuum environment of the housing. The interior of the box beam is maintained at atmospheric pressure, so the pressurized gas expands rapidly through the orifice. The highly cooled gas passes through the hollow detector support and effectively cools the detector array and any associated cold shielding. In the preferred embodiment of the cooling support shown in FIGS. 34 and 35, the cryogen gas flows through a cooling channel 122 adjacent to detector array 20, and the warmed up gas, which is still quite cold, is routed back through a return channel 124 disposed away from the detector array in order to "pre-cool" the incoming cryogen conduit 30 and, more specifically, the high surface area of coiled conduit section 70. This latter approach is known as "Joule-Thomson" or "J-T" cooling, and is generally described in Hudson, *Infrared System Engineering*, John Wiley, N.Y.C., 1969, Chapter 11, page 380. The location, size and orientation of cryogen orifice 72 should be chosen so as to achieve uniformity in cooling across detector array 20.

Figure 36:
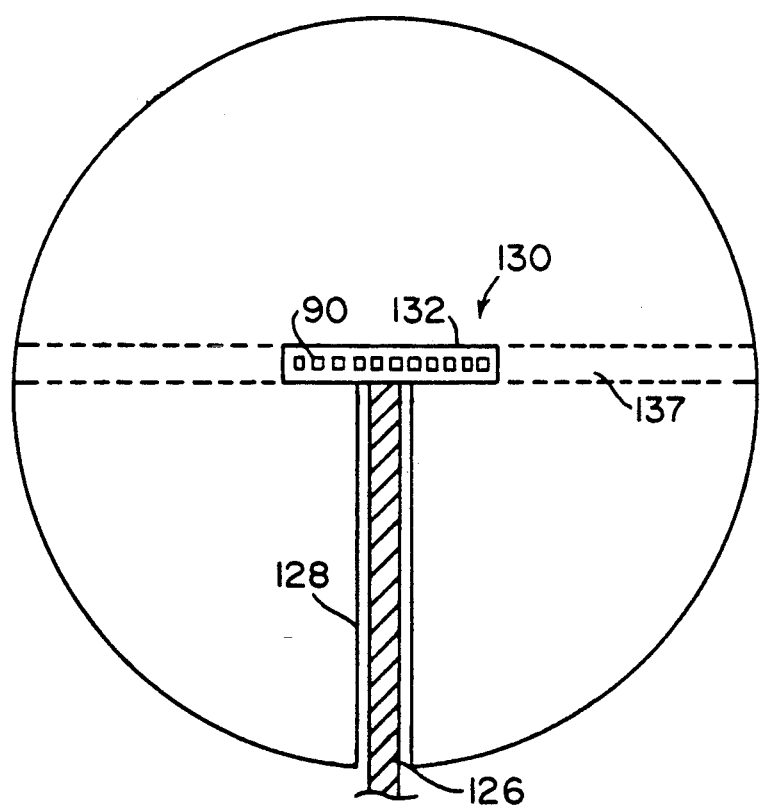
FIG. 36 is an illustration of a detector support mounted on a cold finger.

"Open cycle" cooling, like the J-T method described above, usually requires a "bottle" or reservoir of pressurized cryogen gas, i.e. liquid nitrogen (not shown). This is undesirable in some applications because of the limited life of the coolant supply, which is typically just a few hours or less. For longer term cryogenic cooling, it may be desirable to provide a "closed cycle" system including a cooling engine. Closed cycle systems are generally described in CTI Cryogenics, Application Engineering Note, "Split Sterling Cycle Cryocooler-How it Works". Similar thermal design considerations, i.e. insulation, apply to the closed cycle system as to the J-T approach. In comparison to open cycle systems, closed cycle systems including a cooling engine have a more extended useful life, sometimes on the order of several hundred or thousand hours. In one such closed cycle approach, illustrated in FIG. 36, an integral or split sterling cooling engine (not shown) is employed to cool a cold finger 126 to cryogenic temperature. Cold finger 126 is inserted into a pedestal 128 onto which is mounted a detector assembly 130, and contacts the detector substrate 132 to cool detector array 20. Existing cold fingers are typically 5–7 mm in diameter and 50–60 mm long. A general description of the cold finger structure and use is discussed in Berry et al., "Progress On Miniature Cryocoolers At Hughes Aircraft Company," *Meeting of the IRIS Specialty Group on Infrared Imaging*, Naval Training Center, Orlando, Fla., Mar. 10–12, 1987 (Unclassifed). Optionally, a lateral support structure 134 (shown in phantom) can be employed to facilitate the implementation of the electrical leads to and from the detector array 20 and facilitate the placement of electronics in the focal plane. It is also contemplated that the cold finger could be disposed laterally along the detector support shown in FIG. 36. It is also contemplated that a closed cycle approach could be applied to the embodiment of the invention shown in FIGS. 2-3 by inserting a cold finger into either or both legs 27, 29 (in a bifurcated configuration) of the hollow box beam detector support mounting structure. A bifurcated configuration, i.e. cold fingers disposed within both legs 27, 29, one on either end of the detector array, may require a special cooling engine driving two seperate regenerators, one at each finger.

Figure 37:
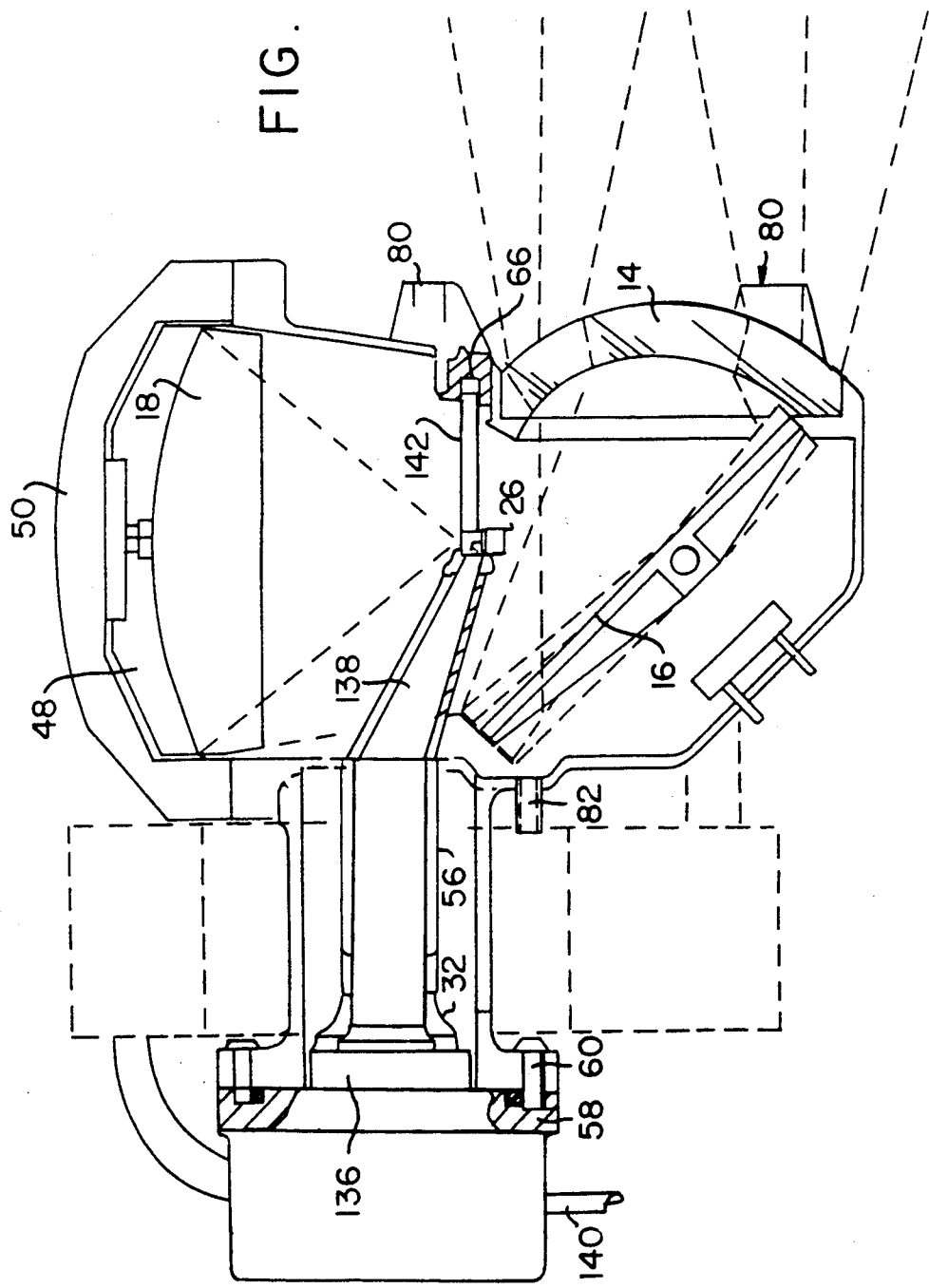
FIG. 37 is a cross-section view of an alternative embodiment of the invention including a closed cycle cooling system.

Referring now to FIG. 37, the embodiment of the invention illustrated in FIGS. 4 and 5 is shown provided with a closed cycle cold finger cooling structure. In FIG. 37, like reference numerals are used to identify and refer to like structural elements of the embodiment previously described in connection with FIGS. 4 and 5. Thus, the configuration of vacuum housing 12 including meniscus window 14, scanning mirror 16 and primary mirror 18 remains the same. Similarly, inner stem 56 extends into the vacuum housing to support curved detector support arch 26 in a position perpendicular to plane of FIG. 37 (see FIG. 5), with the detector array disposed on the curved image surface. A stabilizing beam 142 extends from the detector support arch 26 to the insulated seat 66 to further ensure proper support and positioning of the detector array. Unlike the configuration shown in FIG. 37, however, the open cycle cryogenic cooling assembly of FIGS. 4-5 has been replaced with a closed cycle cooling assembly 136. In this embodiment, inner stem 56 houses a cold finger 138 which contacts detector support arch 26 to cool the support arch and associated detector and cold shield assemblies. Cold finger 138 communicates with and is continuously cooled by a closed cycle cooling engine (not shown) via a cooling engine connection 140.

In the embodiments shown in FIGS. 2-5 and 37 heating of the detector array 20 is greatly reduced by encapsulating the system in a vacuum housing 12. Optical distortions of the focusing mirror 18 and meniscus lens 14 are prevented by providing sufficient strength in the components to prevent their surface contours from being physically distorted by the forces exerted at vacuum. Maintaining a vacuum also maximizes cryogenic cooling of the detector. This yields minimum power input for a closed-cycle cooling engine or, for open cycle systems, longest utilization of a supply of pressurized cryogen. Convection heating is thereby essentially eliminated, leaving only the possibilities of heating by conduction through the detector support structure and by radiation. Heating by conduction is eliminated by mounting the detector support to insulated, low conductivity support elements, leaving only heating by radiation.

Heating by radiation is possible only within the cold shield angle, i.e., within the aperture of the cold shield. For the preferred embodiment wherein individual cold shields are provided for each detector element, potential sources of heating by radiation are limited to the focusing mirror 18, the scanning mirror 16, and the meniscus window 14. Therefore, it is desirable to have minimum emission and maximum reflectance for the mirrors 16 and 18 and minimum absorption for the lens 14. It is also desirable to keep these components at room temperature (cooling them more extensively for certain very demanding applications) and to avoid thermal gradients across their surfaces.

Thermal gradients may lead to undesirable shading in the displayed image because of the variation in detector irradiance. Radiation emitted from these components is proportional to their emission according to Stephan Boltzman law:

$$W = \sigma \epsilon T^4 \qquad (8)$$

where W is the total radiated radiation per unit area, $\epsilon$ is emissivity, $\sigma$ is a constant, and T is the absolute temperature.

Thus, at all penetrations of the housing, e.g. drive shaft 24, electrical leads 32, etc., seal integrity must be carefully maintained. To reduce complexity and provide longer operating performance, static seals, with no moving parts penetrating the pressure boundary are preferred to sliding or rotating seals.

The preferred embodiments of the invention shown in FIGS. 2-5 advantageously minimize the number of moving parts penetrating the housing to drive shaft 24, and incorporates only static seals at all other housing penetrations. Of course, rotary seals of the vacuum qualified ferro-fluidic type may be employed to operate in conjunction with the bearings on the mirror drive shaft and the scanning motor to preserve the housing vacuum. However, it is also contemplated that mirror movement could be accomplished without any need for rotary seals.

Figure 38:
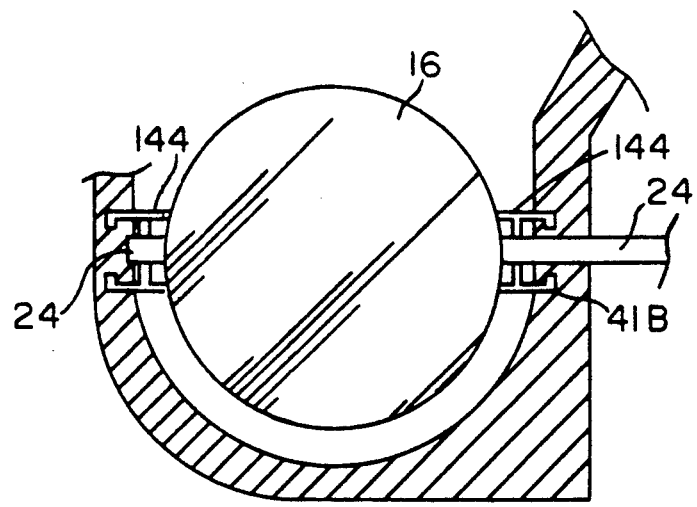
FIG. 38 is an illustration of a torsion tube mounting system for the scanning mirror.

In one contemplated approach shown in FIG. 38, a torsional flexural pivot approach is employed. In this embodiment, a torsion tube 144 is integrally mounted within housing 12, and scanning mirror 16 is attached to the torsion tube. Drive shaft 24 is connected to the inside of torsion tube 144 so that scanning mirror 16 may be rotated back and forth, typically on the order of about plus or minus 10°, by rotating drive shaft 24 via scanning motor 22 to impart rotational movement to the torsion tube and, hence, the scanning mirror. Of course, the scanning mirror must be attached to torsion tube 144 in such a way that twisting or other deformation of the reflecting surface does not occur. The advantage of the torsion tube is that the torsion tube can be mounted to the housing using static seals, with little, if any, need to vacuum seal the drive shaft.

Figure 39:
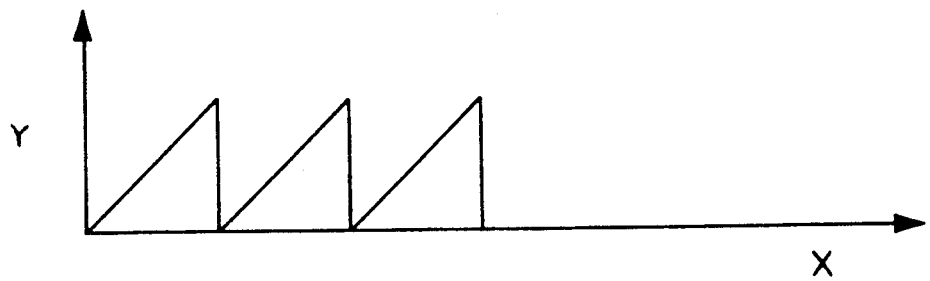
FIG. 39 is an illustration of the ideal scanning mirror angular position waveform.

Regardless of the type of drive system employed, the angular position y of scanning mirror 16 should exhibit the waveform illustrated in FIG. 39. This positioning, which has zero flyback time represented by vertical line 146, shows a scan efficiency of 100% and, therefore, uncompromised system sensitivity. Furthermore, the scan direction is the same for every cycle, thereby simplifying the signal processing electronics. In fact, however, zero flyback time is not possible, and a powerful drive motor and large power source would be required to even approach this condition.

Figure 40:
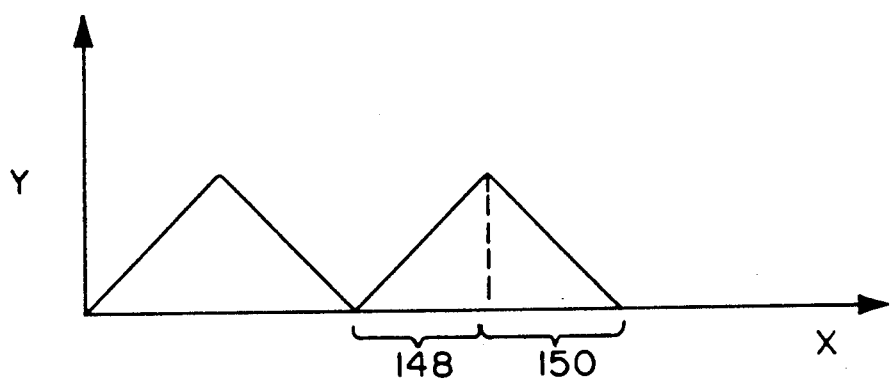
FIG. 40 is an illustration of a bidirectional scanning mirror waveform.

In FIG. 40 the waveform corresponding to a bidirectional scan scan is shown. Segment 148 of the waveform represents the scanning mirror waveform corresponding to one direction of scan, with the segment 150 representing the return scan. This type of drive system has the least power demands of the possible drive systems. The only energy which is necessary to be supplied to a balance spring mass mirror drive system, in this case, is that required to replace the energy lost in the friction of bearings and in the heating of the spring. The bidirectional approach, however, requires that a complete frame of image data be stored during the scan cycle, then flipped about in the electronics and merged with the preceding frame. This requires additional memory circuits and electronic signal control to manipulate and synthesize the image information prior to processing, which would undesirably add to the complexity of the system.

Figure 41:
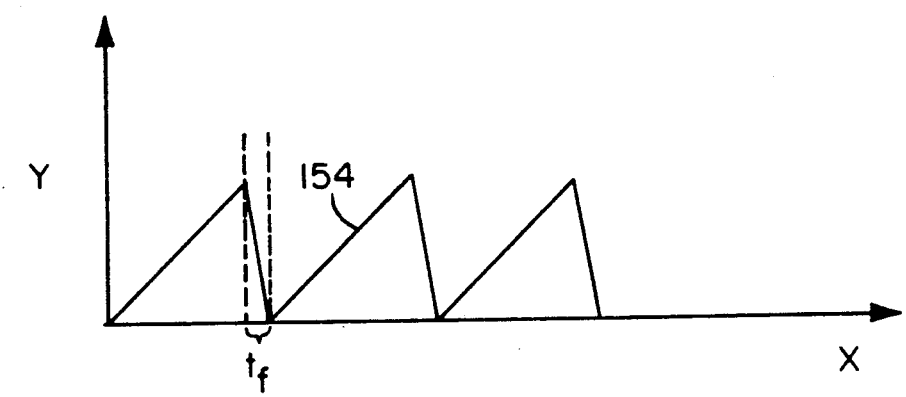
FIG. 41 is an illustration of an alternative unidirectional scanning mirror waveform.

A compromise scanning mirror waveform is shown in FIG. 41. In this compromise drive pattern, a unidirectional scan is maintained and a finite flyback time $t_f$ is tolerated in exchange for reduced power to drive the system. The linear scanning portion of the waveform 154 can be closely approached by an open loop drive circuit consisting of the superimposition of several sinusoidal driving waveforms of the correct amplitude and phase. Any departure from linearity can also be largely eliminated by closing the loop with a position encoder which determines the desired input waveform based upon the position of the scanning mirror feedback system. The difference signal from the feedback loop may then be used to modify the nominal drive waveforms to acheive the required degree of linearity.

The final factor contributing to the efficiency of a thermal imaging system is the number of detectors in the system. If all other factors are held constant, the sensitivity of a thermal imager improves as a multiple of the square root of the number of detector elements in the array. However, the increase in the number of detector elements also leads to an increase in the physical number of input and output electrical leads. For large arrays the number of electrical connections becomes prohibitively large. This is especially the case when low cost, high yield and high reliability are desired. Furthermore, there may not be sufficient area at the detector surface to accommodate such a large number of leads.

Figure 42:
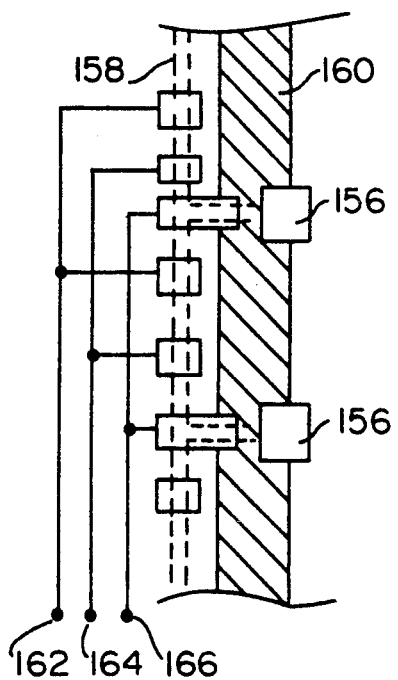
FIG. 42 is an illustration of on-focal-plane processing using charge coupled device (CCD) technology.

The problem of large numbers of leads can be solved by implementing signal processing "on the focal plane." In this way, the output signals of all the detector elements can be combined into a serial format which requires only one output connection. This multiplexing operation can be performed using charge coupled device ("CCD") technology or functionally identical more advanced integrated circuit technology. CCD technology is illustrated in FIG. 42, and is generally described in Wolfe, et al., *The Infrared Handbook*. The infrared information and Analysis (IRAI) Center, Environmental Research Institute of Michigan, Revised Edition.

Referring to FIG. 42, charge build-up in the linear array of detector elements 156 is transferred to the CCD shift register 158 via a transfer gate 160. The transfer gate 160 is opened and closed based upon a pulse train. The pulse train has the frequency necessary to generate a frame of data in the specified time interval. In the preferred embodiment a frame of data is generated in 1/30 sec. While the gate 160 is closed, another line of data is being generated at the detectors, and the previous line of data is read out through the CCD shift register 158. This is accomplished by the sequential, synchronized application of clock pulses, which are illustrated in FIG. 42 as a three phase clock having terminals 162, 164 and 166. The detector array can be a simple linear array, as shown in the FIG. 42. or a more complex array involving multiple columns or rows of detecors. The complex arrays may have staggered elements relative to the preceding column. One such arrangement is the two column configuration shown in FIG. 43.

Figure 43:
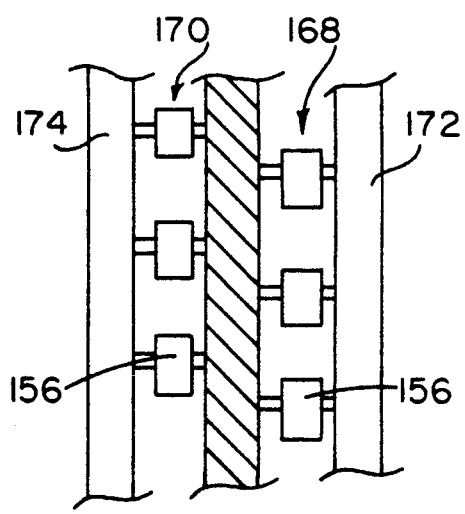
FIG. 43 is an illustration of a multiple column CCD detector array.

In the arrangement illustrated in FIG. 43, two columns of detector elements 168, 170 are staggered by a distance equal to one detector element width in order to produce an image scan without voids in the displayed image. A contiguous spacing of the detector elements 156 in a single column is not possible because of the need for electrical isolation of the elements from one another. The square shape of detectors 156 provides maximum uniformity in pixel size, which is a desirable characteristic for generating imagery for automatic target recognition processors. In multiple column detector arrays a line of pixels in the image will cross the two columns of detectors at different times. Therefore, a time delay should be introduced to the stream of data flowing out of the CCD circuitry 172 which is processing information from the first column of detectors 168 before this pixel image information is merged with the stream of information from the second detector column 170 processed by CCD circuitry 174. A bias voltage is applied in the case of photoconductive detectors, but not if photovoltaic detectors are used. Where pixel size uniformity and resolution in the cross-scan directions are not of utmost importance, further sensitivity can be attained by extending the size of the detector elements 156 to the point where they are almost contiguous.

Additional sensitivity can be achieved without compromising pixel size uniformity and resolution by implementing several of the detector CCD networks in parallel. One such array embodiment envisions four networks. In that case, after the image is scanned across the first network, the output signal is delayed, and then added to the output of the last network. The time delay is determined by the scan rate of the image. The output from the second network is delayed by a lesser amount and then added, and the output from the third network is delayed still less and then added. The output of the last network is not delayed. The resultant improvement in signal to noise ratio is equal to the square root of the number of time-delay-and-integrate ("TDI") operations.

Figure 44:
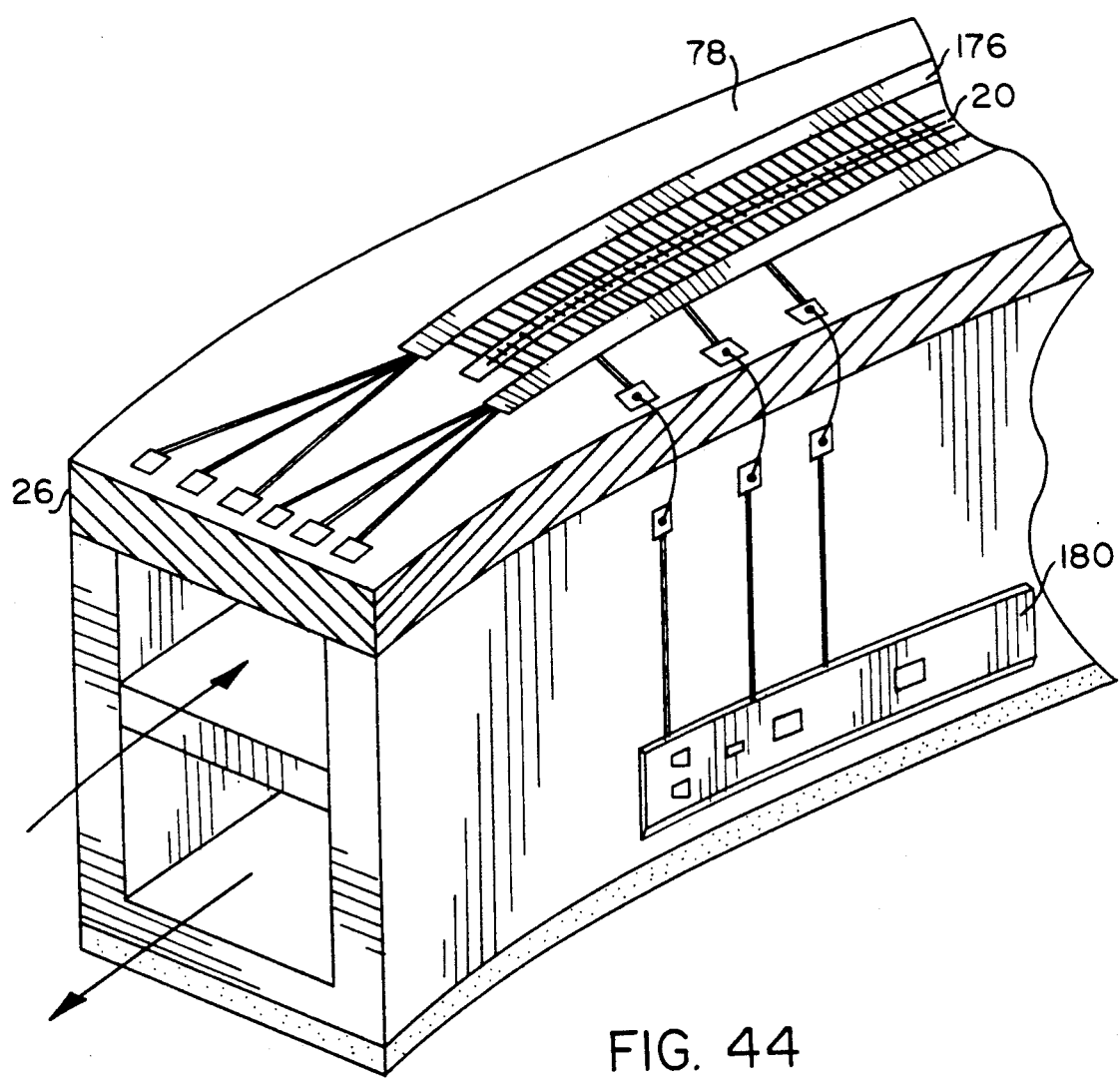
FIG. 44 is a partial section view of the detector support arch illustrating a detector array and processing electronics disposed thereon.

Other focal plane processing, such as non-uniform detector response correction and preamplification of the signal, can also be implemented on the detector support structure as illustrated in FIG. 44. While it is not a requirement to cool processing electronics 176, the closer the electronics are to the detectors the more cooling power that will be required to achieve the desired cooling of the detector array. In comparison to the usual planar detector substrate, the hollow beam detector support structure of the present invention makes it possible to separate and thermally isolate processing circuitry 176 from detector array 20. This separation allows the detector temperature to be reduced with less power than if the coolant is required to cool both the detector and the processing electronics in contiguous relationship. By minimizing the cooling requirement in this way, many more detector elements can be cooled using the same amount of cooling power and the size, weight and power of the cooling engine (not shown) can be reduced accordingly. Monolithic integrated circuits, as well as miniature hybrid circuit components also can be mounted as shown by the hybrid circuit boards 180 on the side of support 26. The bottom and interior surfaces of support 26 provide additional mounting surfaces for processing electronics circuits.

Preferably, detector array 20 and low heat generating processing electronics 176 are formed in a monolithic, or hybrid, CCD construction on a flexible substrate 178 which is both thermally conductive and electrically insulating. The physical properties of the substrate may be chosen to allow the substrate with electronics and detectors to be bent to match the preferred detector support having a curvature dictated by the optical design, i.e., a curved surface conforming to the spherical image surface. Further, the flexible detector substrate and support arch 26 may be fused to make a structurally sound unit. The thermally insulating property of the arched support 26 also keeps heat away from the detector array.

While the above description contains many specifics, it should not be construed as limiting the invention, but merely exemplary thereof. Those skilled in the art will envision many other possible variations that are within the scope of the invention and the claims appended hereto. By way of example only, whereas the preferred embodiments are directed to a cryogenically cooled detector of mercury cadmium telluride operating in the 8 to 12 micron spectrum, a less sensitive, uncooled infrared system using pyroelectric detector technology or thermo-electrically cooled detectors are also possible, as are other detectors for use in non-infrared spectral bands. In a further variation of the preferred embodiment, it is contemplated that the concentric meniscus lens could be located on the opposite side of the scanning mirror vertex, allowing the scanning mirror to be located in a non-vacuum environment. Still further, if the size of the detector array continues to increase the system degenerates to a staring array, dispensing with the need for a scanning mirror. It will also be appreciated that the detectors and circuitry specified herein are for the purpose of illustrating the function of these components and not to illustrate the state-of-the-art in micro-circuit design and manufacture or the only configurations useful in the invention. Current technology would allow for extensive substitution of monolithic detectors and circuitry for the preamplification, timing, multiplexing and time-delay -and-integration functions, as well as others, including non-uniform detector response correction circuitry.

What is claimed is:

1. A thermal imager system comprising:
   (i) a system housing having an evacuated enclosure and a corrector lens window having concentric surfaces for receiving radiation corresponding to a scene to be imaged;
   (ii) detector means disposed inside said enclosure for detecting incident radiation and producing a detector signal;
   (iii) focusing optical element means disposed inside said enclosure for focusing radiation corresponding to at least a portion of a scene onto said detector means.

2. The thermal imaging system of claim 1 further comprising means for cooling said detector means.

3. The thermal imaging system of claim 1 wherein said corrector lens means is made from germanium.

4. The thermal imaging system of claim 1 wherein said focusing optical element means further comprise a concave mirror.

5. The thermal imaging system of claim 4 wherein said concave mirror is a spherical mirror.

6. The thermal imaging system of claim 1 further comprising
   scanning means disposed inside said housing for receiving radiation from said window and scanning said radiation; and
   drive means for scanning said scanning means.

7. The thermal imaging system of claim 6 wherein said focusing optical element means further comprises a concave mirror and said scanning means further comprise a scanning mirror, said scanning mirror being disposed at the center of said concave mirror and directing scanned radiation toward said concave mirror, said concave mirror forming an image at a curved surface.

8. The thermal imaging system of claim 7 wherein said concave mirror is a spherical mirror.

9. The thermal imaging system of claim 1 wherein said detector means further comprises an array of detector elements.

10. The thermal imaging system of claim 9 wherein said array further comprises a two dimensional array.

11. The thermal imaging system of claim 10 further comprising a detector support extending into said housing.

12. The thermal imaging system of claim 11 wherein at least a portion of the system processing electronics is disposed on said detector support.

13. The thermal imaging system of claim 9 wherein said detector elements are made of mercury cadmium telluride.

14. The thermal imaging system of claim 11 wherein said detector support is insulated from said housing.

15. The thermal imaging system of claim 14 wherein said detector support further comprises a conduit for cryogenic coolant.

16. The thermal imaging system of claim 14 further comprising cold shield means extending from said detector support to surround said detector elements.

17. The thermal imaging system of claim 16 wherein said cold shield means individually surrounds each detector element.

18. The thermal imaging system of claim 12 wherein said processing electronics on said detector support further comprise a charge coupled device for combining and multiplexing the output signals of said detector elements.

19. The thermal imaging system of claim 10 wherein said detector array further comprises two staggered rows of detectors.

20. The thermal imaging system of claim 14 wherein said detector support is in contact with a cold finger.

21. The thermal imaging system of claim 15 wherein said detector support is a hollow beam.

22. The thermal imaging system of claim 21 wherein said cryogen conduit further comprises a cryogen orifice, said cryogenic cooling being effected by permitting cryogen gas under pressure to expand through said orifice and flow through said hollow beam.

23. A thermal imager system comprising:
   (i) a system housing having an evacuated enclosure and a window for receiving radiation corresponding to a scene to be imaged;
   (ii) detector means disposed inside said enclosure for detecting incident radiation and producing a detector signal;
   (iii) focusing optical element means comprising a concave mirror disposed inside said enclosure for focusing radiation corresponding to at least a portion of a scene onto said detector;
   (iv) scanning mirror means disposed inside said housing at the center of said concave mirror for receiving radiation from said window and scanning said radiation, said scanning mirror means directing scanned radiation toward said concave mirror, said concave mirror forming an image at a curved surface;
   (v) corrector lens means disposed in the optical path between said window and said focusing optical element means, said corrector lens means having concentric surfaces, said scanning mirror means being aligned with the center of said concentric surfaces; and
   (vi) drive means for scanning said scanning means.

24. The thermal imager system of claim 23 wherein said corrector lens means are in the optical path between said window and said focusing optical element means.

25. A thermal imager system comprising:
(i) a system housing having an evacuated enclosure and a window for receiving radiation corresponding to a scene to be imaged;
(ii) detector means disposed inside said enclosure for detecting incident radiation and producing a detector signal;
(iii) detector support means within said housing to support said detector means, said detector support means comprising a curved arch support;
(iv) focusing optical element means comprising a concave mirror disposed inside said enclosure for focusing radiation corresponding to at least a portion of a scene onto said detector means;
(v) scanning mirror means disposed inside said housing at the center of said concave mirror for receiving radiation from said window and scanning said radiation, said scanning mirror means directing scanned radiation toward said concave mirror and said concave mirror forming an image at a curved surface;
(vi) drive means for scanning said scanning means.

26. The thermal imaging system of claim 25 wherein said curved arch support has a curved detector support surface configured and dimensioned to support said detector means such that said detector means is disposed on at least a portion of said curved image surface.

27. The thermal imaging system of claim 26 wherein said detector means further comprises an array of detector elements.

28. The thermal imaging system of claim 27 wherein said detector array further comprises a curved detector array.

29. A thermal imager system comprising:
(i) a system housing having an evacuated enclosure and a window for receiving radiation corresponding to a scene to be imaged;
(ii) detector means disposed inside said enclosure for detecting incident radiation and producing a detector signal;
(iii) focusing optical element means comprising a concave mirror disposed inside said enclosure for focusing radiation corresponding to at least a portion of a scene onto said detector means;
(v) scanning mirror means disposed inside said housing at the center of said concave mirror means for receiving radiation from said window and scanning said radiation, said scanning mirror means directing scanned radiation toward said concave mirror and said concave mirror forming an image at a curved surface;
(vi) detector support means within said housing to support said detector means, said detector support means providing a substantially curved detector surface defined by a polygon surface, said detector means further comprising a plurality of detector segments disposed on said polygon surface; and
(vi) drive means for scanning said scanning means.

30. A thermal imaging system comprising:
(i) a system housing having an evacuated enclosure and a window for receiving radiation corresponding to a scene to be imaged, said window being a corrector lens;
(ii) scanning means disposed inside said enclosure for scanning radiation received from said corrector lens;
(iii) focusing means disposed inside said enclosure for focusing radiation scanned by said scanning means at an image surface, said focusing means comprising a spherical mirror for forming said image at a curved image surface;
(iv) detector means for detecting at least a portion of said radiation focused by said focusing means; and
(v) means for cooling said detector means.

31. The thermal imaging system of claim 30 further comprising processing electronics for producing an image from detector signals produced by said detector means in response to said radiation.

32. The thermal imaging system of claim 30 further comprising a telescope for directing an image toward said corrector lens.

33. The thermal imaging system of claim 30 wherein said corrector lens has concentric surfaces, said scanning means further comprising a scanning mirror aligned with the center of said concentric surfaces and said spherical mirror.

34. The thermal imaging system of claim 30 wherein said detector means further comprise an array of detector elements.

35. The thermal imaging system of claim 34 further comprising a detector support, said detector support supporting said detector array substantially at said curved image surface.

36. The thermal imaging system of claim 35 wherein said cooling means further comprise a cold finger in contact with said detector support.

37. The thermal imaging system of claim 35 wherein said detector support further comprises a hollow beam, said cooling means further comprising a cryogenic coolant conduit having a cryogen orifice for feeding cryogen into said beam.

38. A thermal imaging system comprising:
(i) a system housing having an evacuated enclosure and a window for receiving radiation corresponding to a scene to be imaged, said window being a corrector lens;
(ii) scanning means disposed inside said enclosure for scanning radiation received from said corrector lens;
(iii) focusing means disposed inside said enclosure for focusing radiation scanned by said scanning means at an image surface;
(iv) detector means for detecting at least a portion of said radiation focused by said focusing means;
(v) a curved strip mirror for receiving radiation from said focusing means and directing said radiation toward said detector means; and
(vi) means for cooling said detector means.

39. The thermal imaging system of claim 38 wherein said strip mirror further comprises a section of a right circular cone.

40. The thermal imaging system of claim 38 wherein said detector means further comprise a planar curved array of detector elements configured and dimensioned to receive said radiation from said curved strip mirror.

41. The thermal imaging system of claim 38 wherein said focusing means further comprise a concave mirror.

42. The thermal imaging system of claim 38 wherein said concave mirror is a spherical mirror.

43. A thermal imaging system comprising:
(i) a system housing having an evacuated enclosure and a window for receiving radiation corresponding to a scene to be imaged;
(ii) focusing optical element means disposed inside said enclosure for focusing radiation corresponding to at least a portion of a scene at a curved image surface; and (iii) detector means disposed inside said enclosure for detecting radiation focussed by said focusing optical element means.

44. The thermal imaging system of claim 43 further comprising means for cooling said detector means.

45. The thermal imaging system of claim 43 further comprising a corrector lens disposed in the optical path between said window and said focusing optical element means.

46. The thermal imaging system of claim 43 wherein said housing window comprises a corrector lens.

47. The thermal imaging system of claim 46 wherein said corrector lens has concentric surfaces.

48. The thermal imaging system of claim 47 wherein said corrector lens is made from germanium.

49. The thermal imaging system of claim 43 wherein said focusing optical element means further comprise a concave mirror.

50. The thermal imaging system of claim 49 wherein said concave mirror is a spherical mirror.

51. The thermal imaging system of claim 43 further comprising
scanning means disposed inside said housing for receiving radiation from said window and conducting a linear scan of said radiation; and drive means for scanning said scanning means.

52. The thermal imaging system of claim 51 wherein said focusing optical element means further comprises a concave mirror.

53. The thermal imaging system of claim 52 wherein said window is a corrector lens having concentric surfaces.

54. The thermal imaging system of claim 53 wherein said scanning means comprise a scanning mirror, said scanning mirror being disposed at the center of said concave mirror and said window lens and directing scanned radiation toward said concave mirror, said concave mirror forming an image at a curved surface.

55. The thermal imaging system of claim 54 wherein said concave mirror is a spherical mirror.

56. The thermal imaging system of claim 43 further comprising detector support means within said housing to support said detector means, said detector support means being a curved arch support.

57. The thermal imaging system of claim 56 wherein said curved arch support has a substantially curved detector support surface configured and dimensioned to support said detector means with said detector means disposed on at least a portion of said curved image surface.

58. The thermal imaging system of claim 57 wherein said detector means further comprise an array of detector elements.

59. The thermal imaging system of claim 58 wherein said detector array further comprises a curved detector array.

60. The thermal imaging system of claim 57 wherein said curved arch support further comprises a conduit for cryogenic coolant.

61. The thermal imaging system of claim 60 further comprising cold shield means extending from said detector support to shield said detector means.

62. The thermal imaging system of claim 60 wherein said curved arch support is a hollow beam.

63. The thermal imaging system of claim 57 wherein said substantially curved detector support surface is defined by a polygon surface, said detector means comprising a plurality of detector segments disposed on said polygon surface.

64. The thermal imaging system of claim 43 further comprising a curved strip mirror for receiving radiation from said focusing means and directing said radiation toward said detector means.

65. The thermal imaging system of claim 64 wherein said curved strip mirror further comprises a section of a right circular cone.

66. The thermal imaging system of claim 64 wherein said detector means further comprise a planar curved array of detector elements configured and dimensioned to receive said radiation from said curved strip mirror.

67. A thermal imager system comprising:
(i) a system housing having an evacuated enclosure and a window for receiving radiation corresponding to a scene to be imaged;
(ii) focusing optical element means comprising a spherical mirror disposed inside said enclosure for focusing radiation corresponding to a scene; and
(iii) detector means disposed inside said enclosure for detecting radiation focused by said focusing optical element means.

68. The thermal imager of claim 67 wherein said housing window further comprises a corrector lens.

69. The thermal imager of claim 67 further comprising scanning means disposed inside said housing for performing a linear scan of radiation received from said window.

70. The thermal imager of claim 69 wherein said scanning means is at the center of said spherical mirror.

71. The thermal imager of claim 69 further comprising a corrector lens having concentric surfaces, said scanning means disposed at the center of said concentric surfaces and said spherical mirror.

72. A thermal imager system comprising:
(i) a system housing having a window for receiving radiation corresponding to a scene to be imaged;
(ii) detector means disposed inside said housing for detecting incident radiation and producing a detector signal;
(iii) focusing optical element means comprising a concave mirror disposed inside said housing for focusing radiation corresponding to at least a portion of a scene onto said detector;
(iv) corrector lens means disposed in the housing in the optical path of said radiation, said corrector lens means having concentric surfaces;
(v) scanning mirror means disposed at the center of said concave mirror and said corrector lens means concentric surfaces for receiving radiation corresponding to a scene to be imaged and performing a linear scan thereof, said scanning mirror means directing scanned radiation toward said concave mirror; and
(vi) drive means for actuating said scanning means.

73. The imager of claim 72 wherein said concave mirror is integrally mounted to a wall of said housing.

74. The imager of claim 72 wherein said concave mirror comprises a spherical mirror.

75. The imager of claim 72 wherein said corrector lens means constitutes said window.

76. The imager of claim 72 wherein the optical system defined by the imager has an entrance pupil on the order of about 30 mm.

77. The imager of claim 72 wherein the optical system defined by the imager has a field of view of about 25°.

78. The imager of claim 72 wherein the optical system defined by the imager has a focal length of about 25 mm.

79. The imager of claim 72 wherein the optical system defined by the imager has an F/no. equal to or less than about 1.0.

80. The imager of claim 72 wherein the optical system defined by the imager has a field of view of about 25° and an F/no. equal to or less than about 1.0.

81. The imager of claim 80 wherein the optical system defined by the imager has a modulation transfer function curve approximating the diffraction limit curve in the 8 to 12 nanometer waveband.

82. The imager of claim 81 wherein the optical system defined by the imager is substantially free from chromatic aberrations across the field of view.

83. The imager of claim 72 wherein the optical system defined by the imager exhibits zonal spherical aberrations smaller than the size of a detector element of said detector means.

84. The imager of claim 72 wherein the optical system defined by the imager exhibits zonal spherical aberrations of not more than about 10 microns.

85. The imager of claim 72 wherein the optical system defined by the imager has a field of view of about 25°, an F/no. equal to or less than about 1.0, a modulation transfer function curve approximating the diffraction limit curve in the 8 to 12 nanometer waveband, and zonal spatial aberration smaller than the size of a detector element of said detector means.

86. The thermal imager system of claim 72 further comprising means for cooling said detector means.

87. The thermal imager system of claim 72 wherein said corrector lens means is made from germanium.

88. The thermal imager system of claim 72 wherein said scanning mirror means comprise a linear scanning mirror, said linear scanning mirror directing scanned radiation toward said concave mirror, said concave mirror forming an image at a curved surface.

89. The thermal imager system of claim 72 further comprising detector support means within said housing to support said detector means, said detector support means being a curved arch support.

90. The thermal imager system of claim 89 wherein said curved arch support has a substantially curved detector support surface configured and dimensioned to support said detector means with said detector means disposed on at least a portion of said curved image surface.

91. The thermal imager system of claim 90 wherein said detector means further comprise an array of detector elements.

92. The thermal imager system of claim 91 wherein said detector array further comprises a curved detector array.

93. The thermal imager system of claim 89 wherein said curved arch support further comprises a conduit for cryogenic coolant.

94. The thermal imager system of claim 93 further comprising cold shield means extending from said detector support to shield said detector means.

95. The thermal imager system of claim 93 wherein said curved arch support is a hollow beam.

96. The thermal imager system of claim 90 wherein said substantially curved detector support surface is defined by a polygon surface, said detector means comprising a plurality of detector segments disposed on said polygon surface.

97. The thermal imager system of claim 72 further comprising a curved strip mirror for receiving radiation from said focusing means and directing said radiation toward said detector means.

98. The thermal imager system of claim 97 wherein said curved strip mirror further comprises a section of a right circular cone.

99. The thermal imager system of claim 97 wherein said detector means further comprise a planar curved array of detector elements configured and dimensioned to receive said radiation from said curved strip mirror.

* * * * *

UNITED STATES PATENT AND TRADEMARK OFFICE
CERTIFICATE OF CORRECTION

PATENT NO. : 5,091,646

DATED : February 25, 1992

INVENTOR(S) : William H. Taylor

It is certified that error appears in the above-identified patent and that said Letters Patent is hereby corrected as shown below:

Column 25, line 45, change "is" to --are--.

Column 26, line 66, after the word "are" insert --disposed--.

Signed and Sealed this

Twenty-first Day of September, 1993

Attest:

BRUCE LEHMAN

Attesting Officer

Commissioner of Patents and Trademarks